(12) United States Patent
Nam et al.

(10) Patent No.: US 12,069,626 B2
(45) Date of Patent: Aug. 20, 2024

(54) ADAPTIVE PROCESSING MODES

(71) Applicant: QUALCOMM Incorporated, San Diego, CA (US)

(72) Inventors: Wooseok Nam, San Diego, CA (US); Jing Sun, San Diego, CA (US); Xiaoxia Zhang, San Diego, CA (US); Tao Luo, San Diego, CA (US); Ozcan Ozturk, San Diego, CA (US); Arumugam Chendamarai Kannan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 190 days.

(21) Appl. No.: 17/491,891

(22) Filed: Oct. 1, 2021

(65) Prior Publication Data
US 2022/0110116 A1    Apr. 7, 2022

Related U.S. Application Data

(60) Provisional application No. 63/088,777, filed on Oct. 7, 2020.

(51) Int. Cl.
*H04W 72/0446* (2023.01)
*H04W 64/00* (2009.01)
(Continued)

(52) U.S. Cl.
CPC ..... *H04W 72/0446* (2013.01); *H04W 64/006* (2013.01); *H04W 72/0453* (2013.01); *H04W 72/21* (2023.01); *H04W 72/23* (2023.01)

(58) Field of Classification Search
CPC ........... H04W 72/0446; H04W 64/006; H04W 72/0453; H04W 72/21; H04W 72/23; H04L 5/0091
See application file for complete search history.

(56) References Cited

U.S. PATENT DOCUMENTS

2007/0087718 A1* 4/2007 Sakakibara .......... H04B 7/0814
                                                              455/277.2
2010/0135274 A1* 6/2010 Hong ................... H04B 7/2656
                                                              370/345
(Continued)

OTHER PUBLICATIONS

Huawei, et al., "Review Summary for AI 7.3.2.2. PUCCH Structure in Long-Duration", 3GPP TSG RAN WG1 Meeting#91, 3GPP Draft, R1-1721380 AI 7322 Review Summary of Long PUCCH_V3, 3rd Generation Partnership Project (3GPP), Mobile Competence Centre, 650, Route Des Lucioles, F-06921 Sophia-Antipolis Cedex, France, vol. RAN WG1, No. Reno, USA, Nov. 27, 2017-Dec. 1, 2017, 16 Pages, Nov. 28, 2017 (Nov. 28, 2017), XP051363853, Retrieved from the Internet: URL: http://www.3gpp.org/ftp/Meetings%5F3GPP%5FSYNC/RAN1/Docs/ retrieved on Nov. 28, 2017] Section 4.

(Continued)

*Primary Examiner* — Christine Ng
(74) *Attorney, Agent, or Firm* — Holland & Hart LLP

(57) ABSTRACT

Methods, systems, and devices for wireless communications are described. Generally, the described techniques provide for configuration of switching between a single-slot processing mode and a multi-slot processing mode. For example, a user equipment (UE) may receive, from a base station, a first configuration of a first processing mode that is associated with communications scheduled for a single slot (e.g., a single-slot processing mode). The UE may also receive a second configuration of a second processing mode that is associated with communications scheduled for a plurality of slots (e.g., a multi-slot processing mode). The UE may communicate according to one of the modes, determine to switch to the other different mode, and communicate according to the different mode.

31 Claims, 14 Drawing Sheets

(51) Int. Cl.
    *H04W 72/0453*    (2023.01)
    *H04W 72/21*      (2023.01)
    *H04W 72/23*      (2023.01)

(56)                References Cited

U.S. PATENT DOCUMENTS

| | | | |
|---|---|---|---|
| 2017/0019902 A1* | 1/2017  | Shahar     | H04W 72/1268 |
| 2019/0159213 A1* | 5/2019  | Baldemair  | H04W 72/23 |
| 2019/0230656 A1  | 7/2019  | Soriaga et al. | |
| 2019/0364600 A1* | 11/2019 | Liu        | H04W 72/12 |
| 2020/0037184 A1* | 1/2020  | Harada     | H04L 5/0053 |
| 2020/0107345 A1  | 4/2020  | Ang et al. | |
| 2020/0137780 A1* | 4/2020  | Kim        | H04W 80/08 |
| 2020/0146062 A1* | 5/2020  | Xu         | H04W 72/23 |
| 2020/0221434 A1  | 7/2020  | Sun et al. | |
| 2020/0336253 A1* | 10/2020 | He         | H04W 4/40 |
| 2021/0297139 A1* | 9/2021  | Kwon       | H04W 52/028 |
| 2021/0360614 A1* | 11/2021 | Baldemair  | H04W 72/1263 |
| 2021/0410107 A1* | 12/2021 | Park       | H04W 76/27 |
| 2022/0015093 A1* | 1/2022  | Ying       | H04B 7/15542 |
| 2022/0070911 A1* | 3/2022  | Baldemair  | H04L 5/0094 |
| 2022/0201770 A1* | 6/2022  | Xu         | H04W 74/0866 |
| 2022/0304064 A1* | 9/2022  | Yoshimura  | H04L 5/005 |
| 2023/0083914 A1* | 3/2023  | Nammi      | H04L 1/1822 |

OTHER PUBLICATIONS

International Search Report and Written Opinion—PCT/US2021/053400—ISA/EPO—Feb. 2, 2022 (208725WO).

\* cited by examiner

ADAPTIVE PROCESSING MODES

CROSS REFERENCE

The present Application for Patent claims the benefit of U.S. Provisional Patent Application No. 63/088,777 by NAM et al., entitled "ADAPTIVE PROCESSING MODES," filed Oct. 7, 2020, assigned to the assignee hereof, and expressly incorporated by reference herein.

FIELD OF TECHNOLOGY

The present disclosure relates to wireless communications, including adaptive processing modes.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long-Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless communications systems may support communications in high frequency bands, such as millimeter wave bands. In these higher frequency bands, larger subcarrier spacing (SCS) may be used to reduce phase noise, which may result in a reduced slot length. In some examples, processing timelines, such as control channel processing, beam switching, and time-domain-duplexing, may not scale with the reduced slot length. For example, in some cases, a UE may take longer than one slot to process a physical downlink control channel (PDCCH).

SUMMARY

The described techniques relate to improved methods, systems, devices, and apparatuses that support adaptive processing modes. Generally, the described techniques provide for configuration of switching between a single-slot processing mode and a multi-slot processing mode. For example, a UE may receive, from a base station, a first configuration of a first processing mode that is associated with communications scheduled for a single slot (e.g., a single-slot or one slot processing mode). The UE may also receive a second configuration of a second processing mode that is associated with communications scheduled for a plurality of slots (e.g., a multi-slot processing mode). The UE may communicate according to one of the modes, determine to switch to the other different mode, and communicate according to the different mode.

A method for wireless communications at a user equipment (UE) is described. The method may include receiving, from a base station, a first configuration of a first processing mode for the UE that is associated with communications scheduled for a single slot, and a second configuration of a second processing mode for the UE that is associated with communications scheduled for a set of multiple slots, communicating with the base station according to one of the first processing mode or the second processing mode, determining that the UE is to switch from communicating according to the one of the first processing mode or the second processing mode to communicating according to a different one of the first processing mode or the second processing mode, and communicating with the base station according to the different one of the first processing mode or the second processing mode based on determining that the UE is to switch.

An apparatus for wireless communications at a UE is described. The apparatus may include a processor, memory coupled with the processor, and instructions stored in the memory. The instructions may be executable by the processor to cause the apparatus to receive, from a base station, a first configuration of a first processing mode for the UE that is associated with communications scheduled for a single slot, and a second configuration of a second processing mode for the UE that is associated with communications scheduled for a set of multiple slots, communicate with the base station according to one of the first processing mode or the second processing mode, determine that the UE is to switch from communicating according to the one of the first processing mode or the second processing mode to communicating according to a different one of the first processing mode or the second processing mode, and communicate with the base station according to the different one of the first processing mode or the second processing mode based on determining that the UE is to switch.

Another apparatus for wireless communications at a UE is described. The apparatus may include means for receiving, from a base station, a first configuration of a first processing mode for the UE that is associated with communications scheduled for a single slot, and a second configuration of a second processing mode for the UE that is associated with communications scheduled for a set of multiple slots, means for communicating with the base station according to one of the first processing mode or the second processing mode, means for determining that the UE is to switch from communicating according to the one of the first processing mode or the second processing mode to communicating according to a different one of the first processing mode or the second processing mode, and means for communicating with the base station according to the different one of the first processing mode or the second processing mode based on determining that the UE is to switch.

A non-transitory computer-readable medium storing code for wireless communications at a UE is described. The code may include instructions executable by a processor to receive, from a base station, a first configuration of a first processing mode for the UE that is associated with communications scheduled for a single slot, and a second configuration of a second processing mode for the UE that is associated with communications scheduled for a set of multiple slots, communicate with the base station according to one of the first processing mode or the second processing mode, determine that the UE is to switch from communicating according to the one of the first processing mode or the second processing mode to communicating according to a different one of the first processing mode or the second processing mode, and communicate with the base station according to the different one of the first processing mode or the second processing mode based on determining that the UE is to switch.

In some examples of the method, apparatuses, and non-transitory computer-readable medium described herein, receiving the second configuration may include operations, features, means, or instructions for receiving, from the base station, a control message that includes an indication of a quantity of slots of the set of multiple slots, where the UE communicates with the base station according to the second configuration using the second processing mode based on the indicated quantity of slots.

In some examples of the method, apparatuses, and non-transitory computer-readable medium described herein, receiving the second configuration may include operations, features, means, or instructions for receiving, from the base station, an indication of a reference subcarrier spacing or a reference slot length and determining a length of each slot of the set of multiple slots of the second configuration based on the reference subcarrier spacing or the reference slot length.

Some examples of the method, apparatuses, and non-transitory computer-readable medium described herein may further include operations, features, means, or instructions for receiving, from the base station, one or more configuration parameter values that may be different for the first processing mode and the second processing mode, the one or more configuration parameter values that may be different including a search space set periodicity, a time domain resource allocation table, a physical uplink control channel resource, or a combination thereof.

In some examples of the method, apparatuses, and non-transitory computer-readable medium described herein, receiving the second configuration may include operations, features, means, or instructions for determining one or more configuration parameter values for the second processing mode based on a quantity of slots for the set of multiple slots.

Some examples of the method, apparatuses, and non-transitory computer-readable medium described herein may further include operations, features, means, or instructions for receiving, from the base station, a control message that activates the set of multiple slots for communications according to the second processing mode, where the UE determines to switch to communicating with the base station according to the second processing mode based on receiving the control message.

Some examples of the method, apparatuses, and non-transitory computer-readable medium described herein may further include operations, features, means, or instructions for determining a time domain location of the set of multiple slots based on an offset relative to a time domain resource in which the control message may be received, where the UE communicates with the base station according to the second processing mode based on determining the time domain location.

In some examples of the method, apparatuses, and non-transitory computer-readable medium described herein, determining to switch may include operations, features, means, or instructions for determining, while communicating according to the first processing mode or the second processing mode, that a time duration may have passed since the UE may have received a scheduling grant from the base station and determining to switch to communicating with the base station according to the to the different one of the first processing mode or the second processing mode based on determining that the time duration may have passed.

Some examples of the method, apparatuses, and non-transitory computer-readable medium described herein may further include operations, features, means, or instructions for receiving, from the base station, a configuration for a bandwidth part that includes an indication that the bandwidth part may be to be used for one of the first processing mode or the second processing mode.

Some examples of the method, apparatuses, and non-transitory computer-readable medium described herein may further include operations, features, means, or instructions for determining to transition from a first bandwidth part to a second bandwidth part for the communications, where the UE determines to switch from the first processing mode to the second processing mode or from the second processing mode to the first processing mode based on determining to transition from the first bandwidth part to the second bandwidth part.

Some examples of the method, apparatuses, and non-transitory computer-readable medium described herein may further include operations, features, means, or instructions for receiving, from the base station, downlink control message that schedules a resource for the UE to use for communication and determining to communicate on the resource using the first processing mode or the second processing mode based on the control message scheduling the resource using downlink control information, using semi-persistent scheduling, or using an uplink-configured grant.

Some examples of the method, apparatuses, and non-transitory computer-readable medium described herein may further include operations, features, means, or instructions for determining a time domain location of the set of multiple slots based on an offset relative to a system reference time, where the UE communicates with the base station according to the second processing mode based on determining the time domain location.

Some examples of the method, apparatuses, and non-transitory computer-readable medium described herein may further include operations, features, means, or instructions for receiving, based on the second configuration for the second processing mode, a physical downlink control channel message during a first slot of the set of multiple slots that schedules one or more uplink messages and one or more downlink messages for the set of multiple slots.

In some examples of the method, apparatuses, and non-transitory computer-readable medium described herein, mapping, based on the second configuration for the second processing mode, a transport block to a physical uplink shared channel resource of one or more slots of the set of multiple slots, where the transport block may be transmitted to the base station based on the mapping.

A method for wireless communications at a base station is described. The method may include transmitting, to a UE, a first configuration of a first processing mode for the UE that is associated with communications scheduled for a single slot, and a second configuration of a second processing mode for the UE that is associated with communications scheduled for a set of multiple slots, communicating with the UE according to one of the first processing mode or the second processing mode, determining that the UE is to switch from communicating according to the one of the first processing mode or the second processing mode to communicating according to a different one of the first processing mode or the second processing mode, and communicating with the UE according to the different one of the first processing mode or the second processing mode based on determining that the UE is to switch.

An apparatus for wireless communications at a base station is described. The apparatus may include a processor, memory coupled with the processor, and instructions stored in the memory. The instructions may be executable by the processor to cause the apparatus to transmit, to a UE, a first configuration of a first processing mode for the UE that is associated with communications scheduled for a single slot, and a second configuration of a second processing mode for the UE that is associated with communications scheduled for a set of multiple slots, communicate with the UE according to one of the first processing mode or the second processing mode, determine that the UE is to switch from communicating according to the one of the first processing mode or the second processing mode to communicating according to a different one of the first processing mode or the second processing mode, and communicate with the UE according to the different one of the first processing mode or the second processing mode based on determining that the UE is to switch.

Another apparatus for wireless communications at a base station is described. The apparatus may include means for transmitting, to a UE, a first configuration of a first processing mode for the UE that is associated with communications scheduled for a single slot, and a second configuration of a second processing mode for the UE that is associated with communications scheduled for a set of multiple slots, means for communicating with the UE according to one of the first processing mode or the second processing mode, means for determining that the UE is to switch from communicating according to the one of the first processing mode or the second processing mode to communicating according to a different one of the first processing mode or the second processing mode, and means for communicating with the UE according to the different one of the first processing mode or the second processing mode based on determining that the UE is to switch.

A non-transitory computer-readable medium storing code for wireless communications at a base station is described. The code may include instructions executable by a processor to transmit, to a UE, a first configuration of a first processing mode for the UE that is associated with communications scheduled for a single slot, and a second configuration of a second processing mode for the UE that is associated with communications scheduled for a set of multiple slots, communicate with the UE according to one of the first processing mode or the second processing mode, determine that the UE is to switch from communicating according to the one of the first processing mode or the second processing mode to communicating according to a different one of the first processing mode or the second processing mode, and communicate with the UE according to the different one of the first processing mode or the second processing mode based on determining that the UE is to switch.

In some examples of the method, apparatuses, and non-transitory computer-readable medium described herein, transmitting the second configuration may include operations, features, means, or instructions for transmitting, to the UE, a control message that includes an indication of a quantity of slots of the set of multiple slots, where the UE communicates with the base station according to the second configuration using the second processing mode based on the indicated quantity of slots.

In some examples of the method, apparatuses, and non-transitory computer-readable medium described herein, transmitting the second configuration may include operations, features, means, or instructions for transmitting, to the UE, an indication of a reference subcarrier spacing or a reference slot length and determining a length of each slot for the set of multiple slots of the second configuration based on the reference subcarrier spacing or the reference slot length.

Some examples of the method, apparatuses, and non-transitory computer-readable medium described herein may further include operations, features, means, or instructions for transmitting, to the UE, one or more configuration parameter values that may be different for the first processing mode and the second processing mode, the one or more configuration parameter values that may be different including a search space set periodicity, a time domain resource allocation table, a physical uplink control channel resource, or a combination thereof.

In some examples of the method, apparatuses, and non-transitory computer-readable medium described herein, transmitting the second configuration may include operations, features, means, or instructions for transmitting an indication of one or more configuration parameter values for the second processing mode based on a quantity of slots for the set of multiple slots.

Some examples of the method, apparatuses, and non-transitory computer-readable medium described herein may further include operations, features, means, or instructions for transmitting, to the UE, a control message that activates the set of multiple slots for communications according to the second processing mode, where the base station determines that the UE may be to communicate according to the second processing mode based on transmitting the control message.

Some examples of the method, apparatuses, and non-transitory computer-readable medium described herein may further include operations, features, means, or instructions for determining a time domain location of the set of multiple slots based on an offset relative to a time domain resource in which the control message may be transmitted, where the base station communicates with the UE according to the second processing mode based on determining the time domain location.

In some examples of the method, apparatuses, and non-transitory computer-readable medium described herein, determining that the UE may be to switch may include operations, features, means, or instructions for determining, while communicating with the UE according to the first processing mode or the second processing mode, that a time duration may have passed since the base station may have transmitted a scheduling grant to the UE and determining that the UE may be to switch to communicating according to the different one of the first processing mode and the second processing mode based on determining that the time duration may have passed.

Some examples of the method, apparatuses, and non-transitory computer-readable medium described herein may further include operations, features, means, or instructions for transmitting, to the UE, a configuration for a bandwidth part that includes an indication that the bandwidth part may be to be used for one of the first processing mode or the second processing mode.

Some examples of the method, apparatuses, and non-transitory computer-readable medium described herein may further include operations, features, means, or instructions for determining that the UE may be to transition from a first bandwidth part to a second bandwidth part, where the base station determines that the UE may be to switch from the first processing mode to the second processing mode or from the second processing mode to the first processing mode based on determining that the UE may be to transition from the first bandwidth part to the second bandwidth part.

Some examples of the method, apparatuses, and non-transitory computer-readable medium described herein may further include operations, features, means, or instructions for transmitting, to the UE, downlink control message that schedules a resource for the UE to use for communication and determining that the UE may be to communicate on the resource using the first processing mode or the second processing mode based on the control message scheduling the resource using downlink control information, using semi-persistent scheduling, or using an uplink-configured grant.

DETAILED DESCRIPTION

A wireless communications system may support communications at higher frequency bands, such as the millimeter wave (mmW) bands. In some cases, these higher bands may be referred to FR3 or FR4. To support communications at these higher frequency bands, an orthogonal frequency division multiplexed (OFDM) waveform with a larger subcarrier spacing (SCS) may be used to reduce phase noise. Due to the larger SCS, a slot length or transmission time interval length may be shorter (e.g., due to the number of symbols designated to a slot) relative to communications at lower frequencies with lower SCSs. However, processing timeless, such as control channel processing, beam switching, and time-domain duplexing direction changes, may not scale with the reduced slot length.

To account for subcarrier spacing adjustments in higher frequency bands, a wireless communications system may support a multi-slot uplink/downlink scheduling mode. In this mode, for example, a single physical downlink control channel (PDCCH) may schedule physical downlink shared channel (PDSCH) and/or physical uplink shared channel (PUSCH) transmissions over multiple slots rather than a PDCCH scheduling PDSCH/PUSCH transmissions for a single slot, as may be performed in accordance with a single-slot mode. As such, the multi-slot mode may account for PDCCH processing and reduce uplink/downlink switching and beam switching. However, supporting single slot and multi-slot scheduling simultaneously may be difficult when using dynamic scheduling, as a user equipment (UE) may need time to adjust internal processing blocks for transitioning to another mode.

Techniques described herein support switching between single-slot processing and multi-slot processing using various signaling techniques. For example, a UE may receive, from a base station, a first configuration of a first processing mode that is associated with communications scheduled for a single slot (e.g., a single-slot processing mode). The UE may also receive a second configuration of a second processing mode that is associated with communications scheduled for a plurality of slots (e.g., a multi-slot processing mode). The UE may communicate according to one of the modes, determine to switch to the other different mode, and communicate according to the different mode.

Aspects of the disclosure are initially described in the context of wireless communications systems. Aspect of the disclosure are further described with respect to a wireless communications system, allocation timelines, and a process flow diagram. Aspects of the disclosure are further illustrated by and described with reference to apparatus diagrams, system diagrams, and flowcharts that relate to adaptive processing modes.

Figure 1:
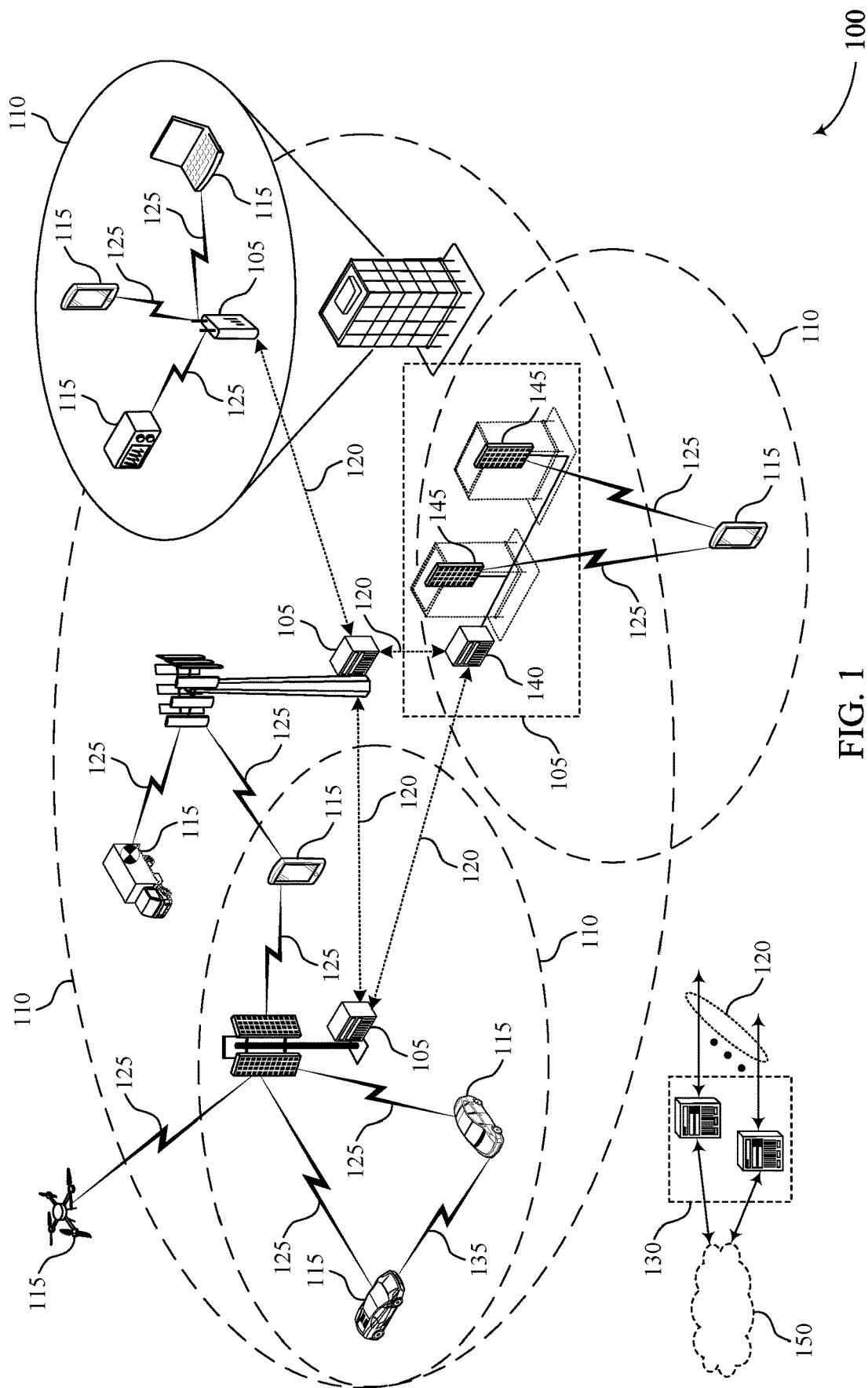
FIG. 1 illustrates an example of a system for wireless communications that supports adaptive processing modes in accordance with aspects of the present disclosure.

FIG. 1 illustrates an example of a wireless communications system 100 that supports adaptive processing modes in accordance with aspects of the present disclosure. The wireless communications system 100 may include one or more base stations 105, one or more UEs 115, and a core network 130. In some examples, the wireless communications system 100 may be a Long-Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_S=1/$ ($\Delta f_{max} \cdot N_f$) seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples. Devices in wireless communications system 100 may communicate over unlicensed spectrum, such as the 5 GHz band, the 2.4 GHz band, the 60 GHz band, the 3.6 GHz band, and/or the 900 MHz band. The unlicensed spectrum may also include other frequency bands.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

As described herein, the wireless communications system 100 may support communications at higher frequency bands, such as mmW band. In some cases, these higher bands may be referred to FR3 or FR4. To support communications at these higher frequency bands, an OFDM waveform with a larger subcarrier spacing may be used to reduce phase noise. Due to the larger SCS, a slot length or transmission time interval length may be shorter (e.g., due to the number of symbols designated to a slot). However, processing timeless, such as control channel processing, beam switching, and time-domain duplexing direction changes, may not scale with the reduced slot length. For example, in some cases, it may take longer than one slot for a UE 115 to process a received PDCCH.

To account for subcarrier spacing adjustments in higher frequency bands, wireless communications system 100 may support a multi-slot uplink/downlink scheduling mode. In this mode, for example, a single physical downlink control channel (PDCCH) may schedule physical downlink shared channel (PDSCH) and/or physical uplink shared channel (PUSCH) transmissions over multiple slots rather than a PDCCH scheduling PDSCH/PUSCH transmissions for a single slot, as may be performed in accordance with a single-slot mode. As such, the multi-slot mode may account for PDCCH processing and reduce uplink/downlink switching and beam switching. However, supporting single slot and multi-slot schedule simultaneous may be difficult when using dynamic scheduling, as a UE 115 may need time to adjust internal processing blocks for transitioning to another mode. For example, if both single and multi-slot dynamic scheduling is supported simultaneously and the UE 115 is not configured with the timing for being scheduled for single-slot or multi-slot communications, then the UE 115 should be configured with the most stringent (e.g., process-intensive) case, which may be single-slot scheduling. As such, there may not be any gain of using multi-slot scheduling, such as timeline relaxation, power consumption reduction, and the like.

Implementations described herein support switching between single-slot processing and multi-slot processing using various signaling or configuration techniques, such that the UE 115 may be able to benefit from the multi-slot scheduling, such as timeline relaxation, power consumption reduction, and the like. For example, a UE 115 may receive, from a base station 105, a first configuration of a first processing mode that is associated with communications scheduled for a single slot (e.g., a single-slot processing mode). The UE 115 may also receive a second configuration of a second processing mode that is associated with communications scheduled for a plurality of slots (e.g., a multi-slot processing mode). The UE 115 may communicate according to one of the modes, determine to switch to the other different mode according to the configurations, and communicate according to the different mode.

In some cases, the base station 105 may indicate a number of slots that is to be used for the multi-slot scheduling mode. For example, the length of a communication processing grid (e.g., a "nominal grid" for the multi-slot processing mode) may be indicated as an integer number of slots (e.g., N slots) that may be referred to as the nominal grid length. In some examples, the configuration for communications for the multi-slot mode may be configured via a first control message (e.g., radio resource control (RRC) messaging), and then the number of slots may be activated via a second control message (e.g., medium access control layer control element (MAC-CE)) messaging or downlink control information (DCI) messaging). These and other implementations are described further with respect to the following figures.

Particular aspects of the subject matter described herein may be implemented to realize one or more advantages. The described techniques may support improvements in the high frequency band communication framework, decreasing signaling overhead, and improving reliability, among other advantages. As such, supported techniques may include improved network operations and, in some examples, may promote network efficiencies, among other benefits.

Figure 2:
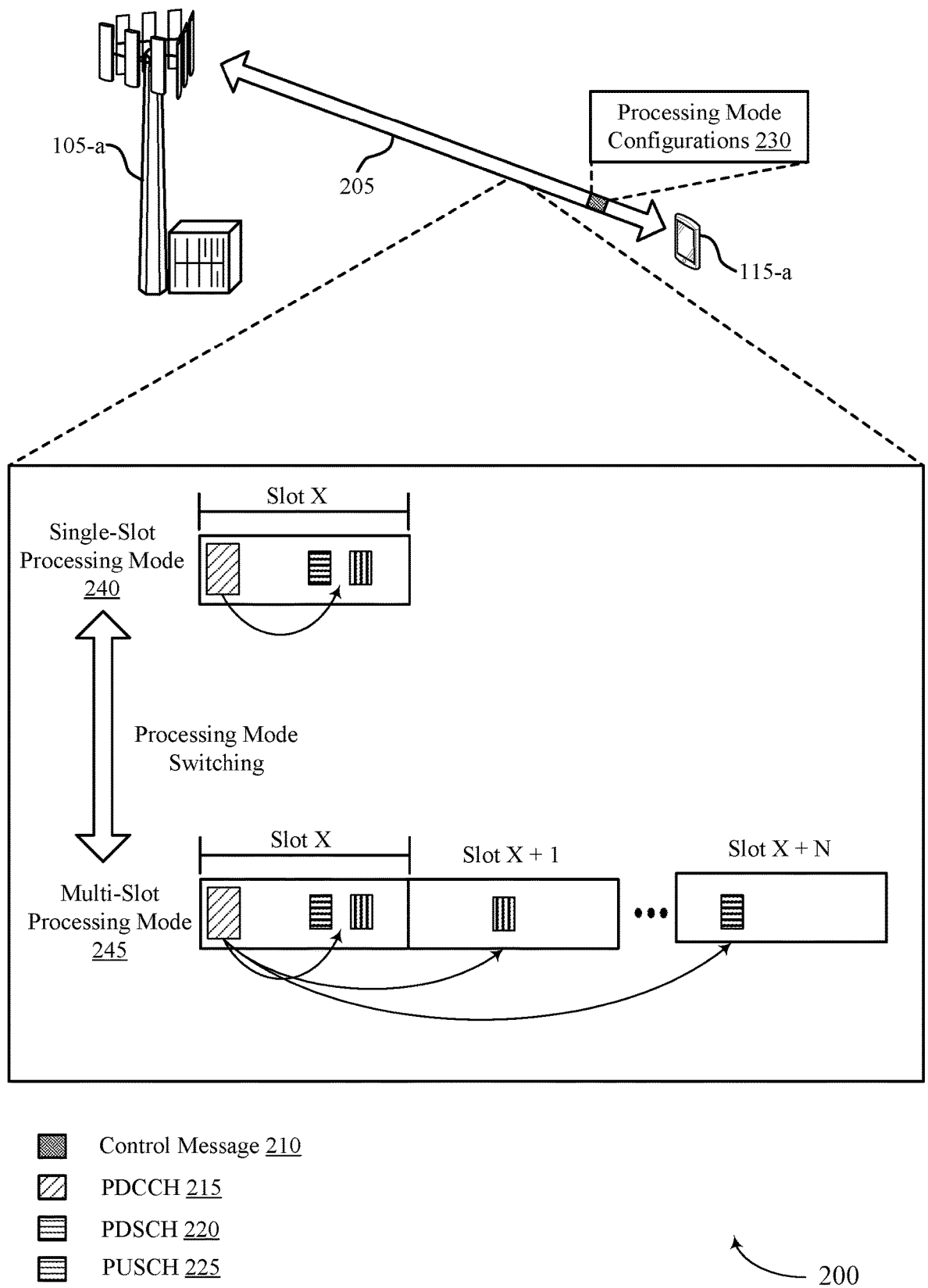
FIG. 2 illustrates an example of a wireless communications system that supports adaptive processing modes in accordance with aspects of the present disclosure.

FIG. 2 illustrates an example of a wireless communications system 200 that supports adaptive processing modes in accordance with aspects of the present disclosure. In some examples, wireless communications system 200 may implement aspects of wireless communications system 100. The wireless communications system 200 includes a base station 105-a and a UE 115-a, which may be examples of the corresponding devices as described with respect to FIG. 1.

The wireless communications system 200 may support communications at various frequency bands. In some examples, the wireless communications system 200 supports new-radio (NR) applications with higher carrier frequencies, such as in FR4 (e.g., 2.6 GHz-114.25 GHz). In such cases, a large subcarrier spacing (e.g., 240 kHz-1.92 MHz), relative to subcarrier spacing corresponding to lower frequencies, may be used to limit phase noise. However, use of a large subcarrier spacing may result in a shorter slot length. For example, FR2 may be associated with 120 kHz subcarrier spacing resulting in a slot length of 125 μSec, and FR4 may be associated with a with 960 kHz subcarrier spacing resulting in a slot length of 15.6 μSec.

These reduced slot lengths may result in various processing considerations. For example, due to implementation complexity the processing timeline of the UE 115 (e.g., the control and data processing) may not proportionally scale with the reduced slot length. More particularly, the slot length in FR4 is reduced by a factor of about eight relative to FR2, but the processing timeline may not scale in such a manner due to implementation complexity limitations at the UE 115-a. In one example, UEs 115 may benefit (e.g., power saving benefits) from micro-sleep, where a control region of a slot is a first few (e.g., three) symbols of a slot. After receiving the control channel in the control region, the UE 115 may perform some PDCCH processing. As a result of the PDCCH processing, the UE 115 may enter a micro-sleep mode (e.g., reduced radiofrequency (RF) power and offline processing) during the remaining symbols of the slot, if the PDCCH does not schedule any transmission in the remaining symbols of the slot. For example, the PDCCH may schedule resources for communications in a subsequent slot (e.g., cross-slot scheduling). However, in FR4, the PDCCH processing timeline may be comparable to or greater than the slot length. As a result, micro-sleep may not be available or eligible in FR4. Further, in FR1 and FR2, the UE 115 may be configured to monitor for the PDCCH in each slot. However, in FR4, due to limited processing capability, the minimum PDCCH monitoring periodicity may be greater than one slot, which results in the UE 115 not being able to monitor the PDCCH in each slot. Thus, the UE 115 may be configured to monitor the PDCCH in every n slots.

Additional example processing considerations due to the increased subcarrier spacing may be beam switching and TDD direction changes. Regarding beam switching, frequent retuning of the RF components (e.g., beam switching) may result in higher overhead in FR4 relative to FR1/FR2. In FR2 with a 120 kHz SCS, the analog beam switching delay may be contained within a cyclic prefix duration (e.g., 584 ns). However, in FR4, a standard cyclic prefix duration may be 73 ns and the beam switching delay may not be contained within the cyclic prefix duration. Thus, additional beam switching gap of an integer number of OFDM symbols may be used to account for the beam switching delay, which may result in additional processing and scheduling considerations. Additionally, in FR2 with 120 kHz SCS, TDD link direction change (downlink to uplink or uplink to downlink) may be accomplished within two symbols, for example. However, in FR4 with a 960 kHz SCS, a TDD direction change may be performed in more symbols (e.g., greater than two).

To address these considerations, the wireless communications system may support multi-slot uplink/downlink scheduling (e.g., a multi-slot processing mode 245). According to the multi-slot processing mode 245, a PDCCH 215 may schedule PDSCH 220 and PUSCH 225 transmission over multiple slots. Further, a single transport block (TB) may be mapped (e.g., via rate-matching) to the PDSCH 220 or PUSCH 225 transmissions across multiple slots. The multi-slot processing mode 245 thus may support reduced beam switching, reduced TDD direction switching, and may account for PDCCH processing delays. However, supporting both a single-slot processing mode 240 and a multi-slot processing mode 245 with dynamic scheduling may be difficult because the UE 115-a may need a stable processing cycle (e.g., slot) to arrange/schedule internal processing blocks, which may operate in a parallel, serial, or pipelined manner.

Implementations described herein support activating and deactivating multi-slot processing or switching between a single-slot processing mode 240 and a multi-slot processing mode 245. To support the mode switching, the base station 105-a may transmit one or more control messages 210 that include an indication of processing mode configurations 230. For example, the UE 115 may receive a first configuration of a first processing mode for the UE 115 that is associated with communications scheduled for a single slot (e.g., the single-slot processing mode 240). The UE 115 may also receive a second configuration of second processing mode for the UE 115 that is associated with communications scheduled for multiple slots (e.g., the multi-slot processing mode 245). In some examples, the configurations may be associated with configuration parameters that indicate a search space set periodicity, a time domain resource allocation table, a physical uplink control channel resource, or a combination thereof. For the multi-slot processing mode 245, the configuration may include a quantity of slots that defines a nominal grid for multi-slot processing. More particularly, the nominal grid length may be indicated to the UE 115-a, and the length of the grid may be an integer multiple of the slot (e.g., N slots)

In case of mixed numerologies (e.g., in a carrier aggregation scenario with mixed numerologies), different carriers have different subcarrier spacing. In intra-band carrier aggregation, the hardware may be shared by multiple carriers, and thus the nominal grid may be common for the carriers, even though the SCSs may be associated with different slot lengths. As such, the base station 105-a may indicate a reference slot length. In some examples, this indication may be based on a reference subcarrier spacing. Accordingly, the base station 105-a may indicate the reference subcarrier spacing that the UE 115-a is to use to determine the slot length (e.g., using an index value), and thus determine the nominal grid based on an indicated N slots. In some perspectives, the slot definition is changed from 14 contiguous symbols to 14*N contiguous signals, where N is >1.

In some examples, the nominal grid may be indicated to the UE 115-a by the base station 105-a via RRC signaling, MAC-CE signaling, DCI signaling, or a combination thereof. Upon receiving the indication, the UE 115-a may adjust or reconfigure internal processing blocks/modes to optimize for the multi-slot scheduling. In some examples, the grid length N may be RRC configured for the UE 115-a, and then activated and deactivated (or switched to and from) using MAC-CE or DCI. Thus, upon activation, the UE 115-a may adjust or reconfigure internal processing blocks/modes to optimize for the scheduling. In some cases, a timer-based activation/deactivation of the multi-slot processing mode may be supported. For example, upon expiration of a timer, the UE 115-a may determine to switch from the single-slot processing mode 240 to the multi-slot processing mode 245. In some cases, the timer is based on a scheduling grant. For example, if one of the modes is a default mode, and the UE 115-a is operating in a mode other than the default mode, then the UE 115-a may switch modes if no scheduling grant is received from the base station 105-a for some configured amount of time or duration. Thus, if in the single-slot processing mode 240 and the UE 115-a does not receive a scheduling indication from the base station for the configured time, the UE 115-a may determine to switch to the multi-slot processing mode 245, which may be considered the default processing mode in this example. It should be understood that other types of timer configurations and activation scenarios are contemplated within the scope of this disclosure.

In some examples, the indication of the single and multi-slot modes may be bundled with a bandwidth part (BWP) configuration. For example, when the UE 115-a is configured with a BWP, then the configured BWP may be associated with a mode of either the single-slot processing mode 240 or the multi-slot processing mode 245. This configuration may be indicated via a flag or field associated with a BWP. Thus, when the UE 115-a switches to another BWP, then the UE 115-a may determine to switch processing modes based on the mode that is associated with the new BWP.

In some examples, the single-slot processing mode 240 and the multi-slot processing mode 245 may be globally or separately indicated or configured for different channels. In an example, upon activation of the multi-slot processing, each channel (e.g., PDCCH, PUCCH, PDSCH, and PUSCH) may be used in the multi-slot grid. In another example, the data channels (e.g., PDSCH and PUSCH) may be communicated in the multi-slot grid, while the control channels (PDCCH and PUCCH) may operate according to the single slot grid.

In some cases, the mode that is used may depend on the type of scheduling grant. For example, a dynamic grand indicated via DCI may be associated with a multi-slot mode, while a semi-persistent scheduling (SPS) grant or an uplink configured grant may be associated with a single slot mode. Thus, when the UE 115-a receives a DCI that schedules a PUSCH or PDSCH, then the UE 115-a may determine to use the multi-slot mode for such communications. It should be understood modes may be associated with the scheduling grant differently from the above example as configured by the processing mode configurations 230. Further, the used mode may depend on the carrier. For intra-band carrier aggregation, multiple component carriers in the same band may be configured to use the same processing mode, while the component carriers in different bands may use a different processing mode. Thus, the type of mode that that UE 115-a is to use may depend on an activation message (e.g., a control message), a type of scheduling grant, a BWP that is to be used, the component carrier, or a combination thereof.

The configuration details or parameters may be indicated for the single-slot processing mode 240 and the multi-slot processing mode 245. The parameters may include values that indicate a search-space set periodicity, a time domain resource allocation table, a physical uplink control channel resource, other resources, or a combination thereof. In some examples, each of these parameter values may be separately configured for each mode. In other cases, one or more of the parameters may be shared between the single-slot processing mode 240 and the multi-slot processing mode 245. The configuration parameters may be shared but re-interpreted depending on the selected mode. For example, the time-domain resource allocation table may be shared between the single-slot processing mode 240 and the multi-slot processing mode 245, and parameters in the table (e.g., starting symbol index in a slot(S) and the length of allocation (L)) may be re-interpreted as S'=S*N and L'=L*N, where N is the length of the nominal grid (e.g., the number of slots). This example may be used since the length of the allocation may be up to 14N symbols.

Figure 3:
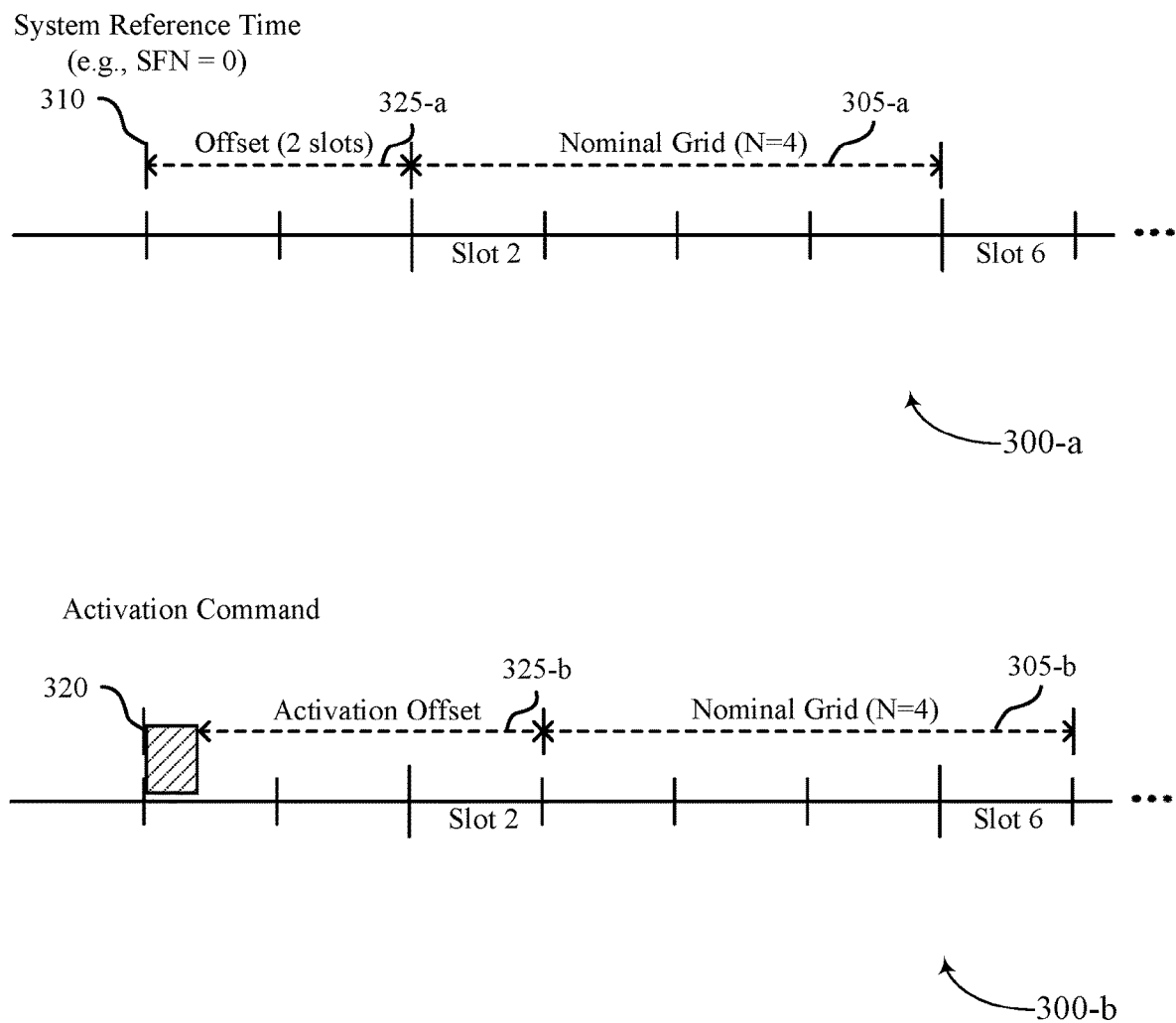
FIG. 3 illustrates examples of allocation timelines that support adaptive processing modes in accordance with aspects of the present disclosure.

FIG. 3 illustrates examples of allocation timelines 300 that support adaptive processing modes in accordance with aspects of the present disclosure. In some examples, the allocation timelines 300 may be implemented aspects of wireless communications system 100. For example, the allocation timelines 300 may be implemented by a base station 105 and a UE 115, as described with respect to FIGS. 1 and 2.

In allocation timeline 300-a, the base station 105 may indicate that a nominal grid 305-a has a length of four slots. The UE 115 may determine the time domain starting location based on an offset 325-a, which may be configured by the base station 105. Thus, when operating in the multi-slot processing mode, the UE 115 may determine the time domain starting location of the nominal grid 305-a relative to a system reference time 310 (e.g., system frame number 0) using the offset 325-a.

In allocation timeline 300-b, the UE 115 may receive an activation command 320 for the multi-slot processing mode. The activation command 320 may be an example of a DCI message or MAC-CE after nominal grid is configured via RRC signaling. In another example, the activation command 320 may be an example of a scheduling grant, a bandwidth part indication, etc. that may be used to indicate a processing mode to use. The UE may identify the location of the nominal grid 305-b based on the activation grant and an activation offset 325-b. The activation offset may be pre-configured (e.g., via RRC) or may be indicated in the activation command 320. For example, the activation offset 325-b may be dynamically determined by the activation command 320 of multi-slot processing.

Figure 4:
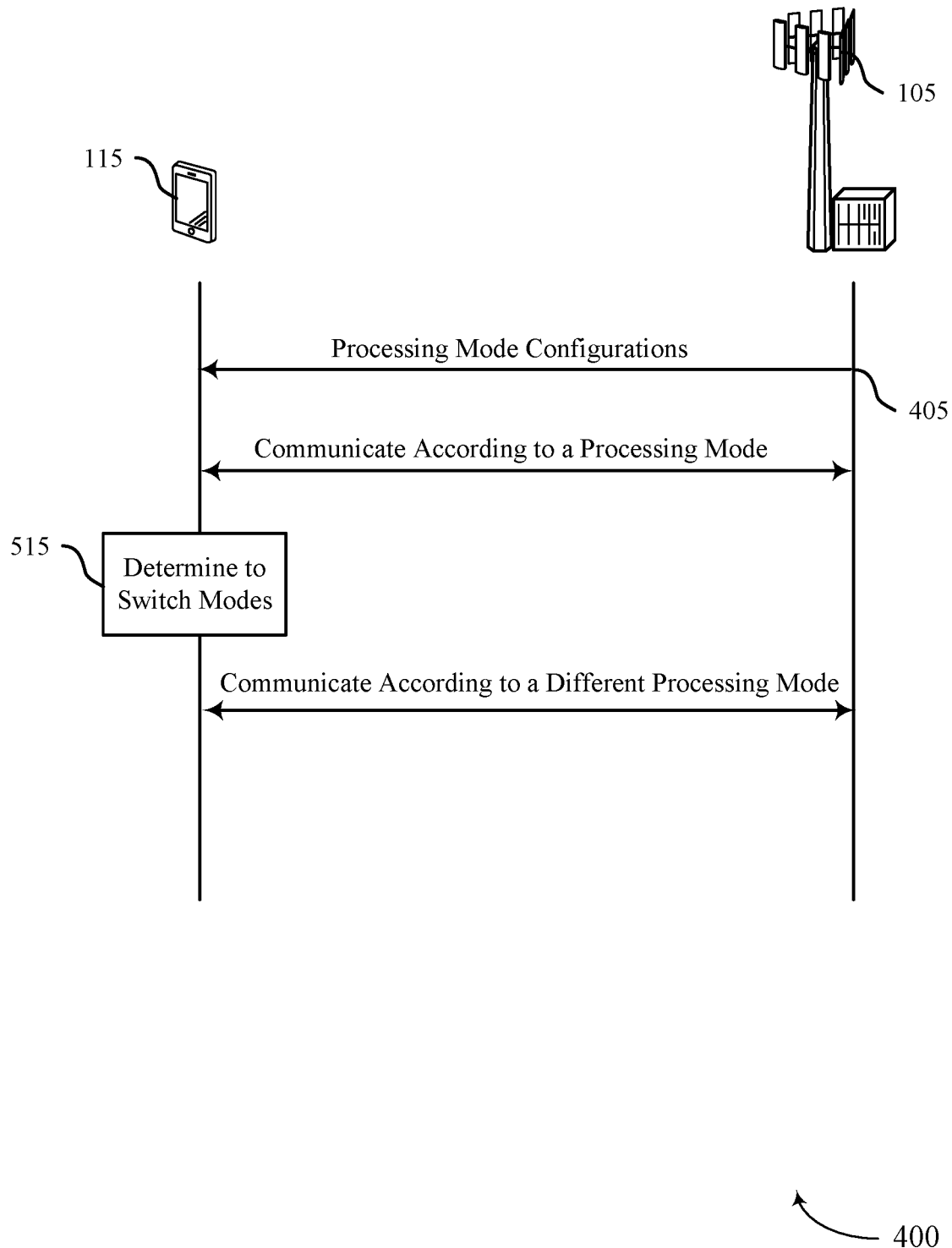
FIG. 4 illustrates an example of a process flow diagram that supports adaptive processing modes in accordance with aspects of the present disclosure.

FIG. 4 illustrates an example of a process flow diagram 400 that supports adaptive processing modes in accordance with aspects of the present disclosure. In some examples, process flow diagram 400 may be implemented by aspects of wireless communications system 100 and 200. The process flow diagram includes a base station 105-b and a UE 115-a, which may be examples of the corresponding devices as described with respect to FIGS. 1 through 3.

At 405, the UE 115-b may receive, from the base station 105-b, a first configuration of a first processing mode for the UE that is associated with communications scheduled for a single slot (e.g., a single-slot processing mode configuration), and a second configuration of a second processing mode for the UE that is associated with communications scheduled for a plurality of slots (e.g., a multi-slot processing mode configuration). The first configuration and the second configuration may be received in separate control messages. In some examples, one or both of the configurations are transmitted via RRC signaling, MAC-CE, singling, DCI singling, or a combination thereof. The second configuration may include an indication of a quantity of slots (e.g., N) of the plurality of slots. In some cases, the first and second configuration include different configuration parameters. In other cases, the first and second configuration may share one or more of the configuration parameters. The configuration parameters may also indicate whether channels are communicated on a single slot or on the plurality of slots according to the second processing mode. In some cases, the configuration parameters may indicate a reference subcarrier spacing that the UE 115-*b* is to use to determine the length of the slot for the multi-slot processing mode.

At 410, the UE 115-*b* may communicate, with the base station 105-*b* according to one of the first processing mode or the second processing mode.

At 415, the UE 115-*b* may determine that the UE 115-*b* is to switch from communicating according to the one of the first processing mode or the second processing mode to communicating according to a different one of the first processing mode or the second processing mode. In some examples, the UE 115-*b* may determine to switch based on receiving an instruction from the base station (e.g., an activation or deactivation command), based on expiration of a timer, based on switching bandwidth parts, based on receiving a scheduling grant, based on a used carrier, or any combination thereof.

Figure 5:
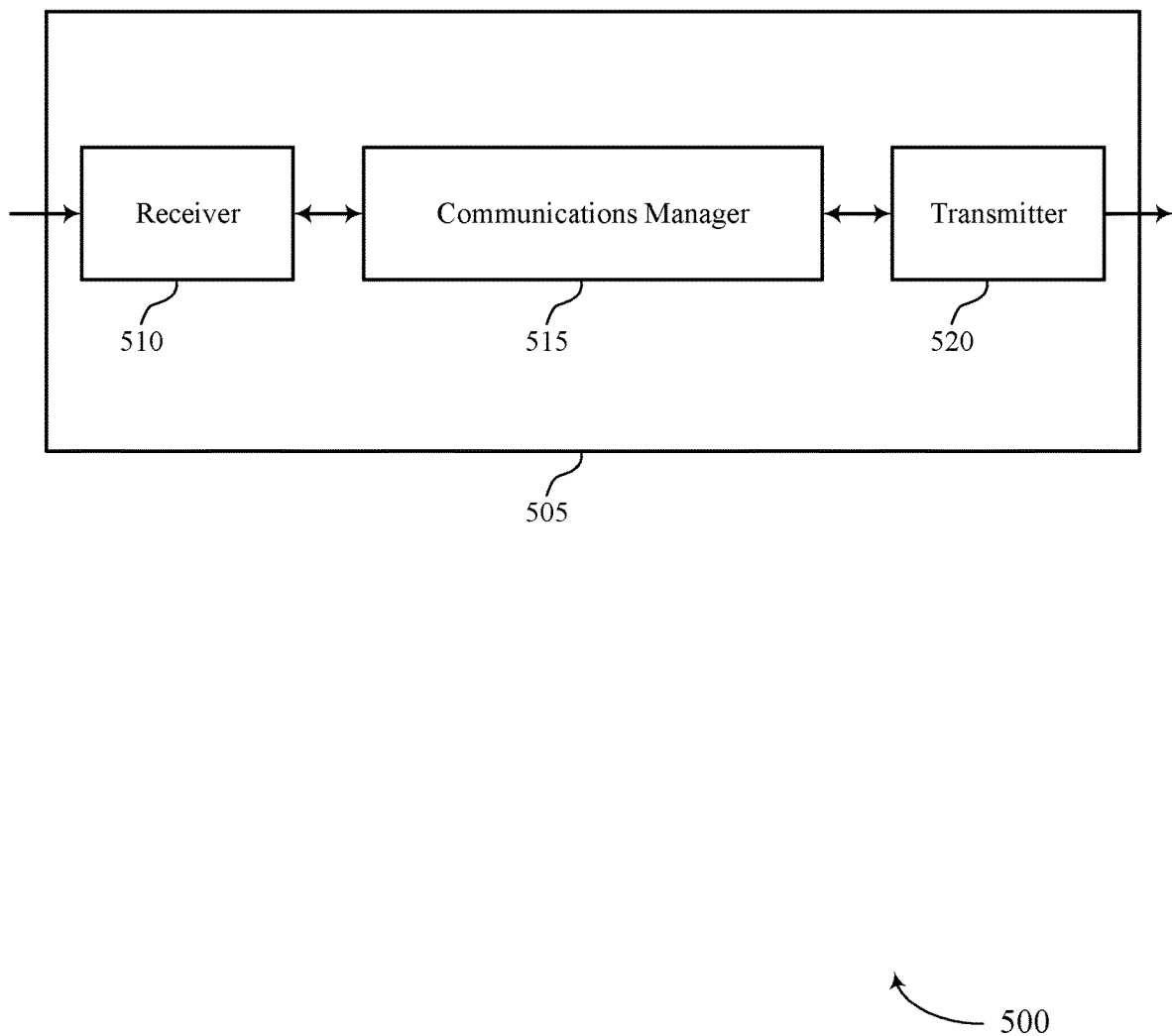
FIGS. 5 and 6 show block diagrams of devices that support adaptive processing modes in accordance with aspects of the present disclosure.

At 420, the UE 115-*b* may communicate with the base station 105-*a* according to the different one of the first processing mode or the second processing mode based at least in part on determining that the UE is to switch FIG. 5 shows a block diagram 500 of a device 505 that supports adaptive processing modes in accordance with aspects of the present disclosure. The device 505 may be an example of aspects of a UE 115 as described herein. The device 505 may include a receiver 510, a communications manager 515, and a transmitter 520. The device 505 may also include a one or more processors, memory coupled with the one or more processors, and instructions stored in the memory that are executable by the one or more processors to enable the one or more processors to perform the processing mode switching features discussed herein. Each of these components may be in communication with one another (e.g., via one or more buses).

The receiver 510 may receive information such as packets, user data, or control information associated with various information channels (e.g., control channels, data channels, and information related to adaptive processing modes, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may receive, from a base station, a first configuration of a first processing mode for the UE that is associated with communications scheduled for a single slot, and a second configuration of a second processing mode for the UE that is associated with communications scheduled for a set of slots, communicate with the base station according to one of the first processing mode or the second processing mode, determine that the UE is to switch from communicating according to the one of the first processing mode or the second processing mode to communicating according to a different one of the first processing mode or the second processing mode, and communicate with the base station according to the different one of the first processing mode or the second processing mode based on determining that the UE is to switch. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a digital processor (DSP), an application-specific integrated circuit (ASIC), a FPGA or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

In some examples, the communications manager 515 may be implemented as an integrated circuit or chipset for a mobile device modem, and the receiver 510 and transmitter 520 may be implemented as analog components (e.g., amplifiers, filters, antennas) coupled with the mobile device modem to enable wireless transmission and reception over one or more bands.

The communications manager 515 as described herein may be implemented to realize one or more potential advantages. One implementation may allow the device 505 to more efficiently coordinate communication between a base station 105 and the device 505, and more specifically to coordinate multi-slot processing from the device 505 to one or more base station to support efficient communications in some frequency bands, such as in FR4. For example, the device 505 may identify a configuration to use for communicating in the multi-slot processing mode, based on a received configuration, and to efficiently switching between a single-slot processing mode and a multi-slot processing mode.

Based on implementing the feedback mechanism techniques as described herein, a processor of a UE 115 (e.g., controlling the receiver 510, the transmitter 520, or the transceiver 820 as described with reference to FIG. 8) may increase reliability and decrease signaling overhead in the communication because the configuration may be indicated to the UE 115 and the UE may be able to switch between modes based on various signaling or conditions.

Figure 6:
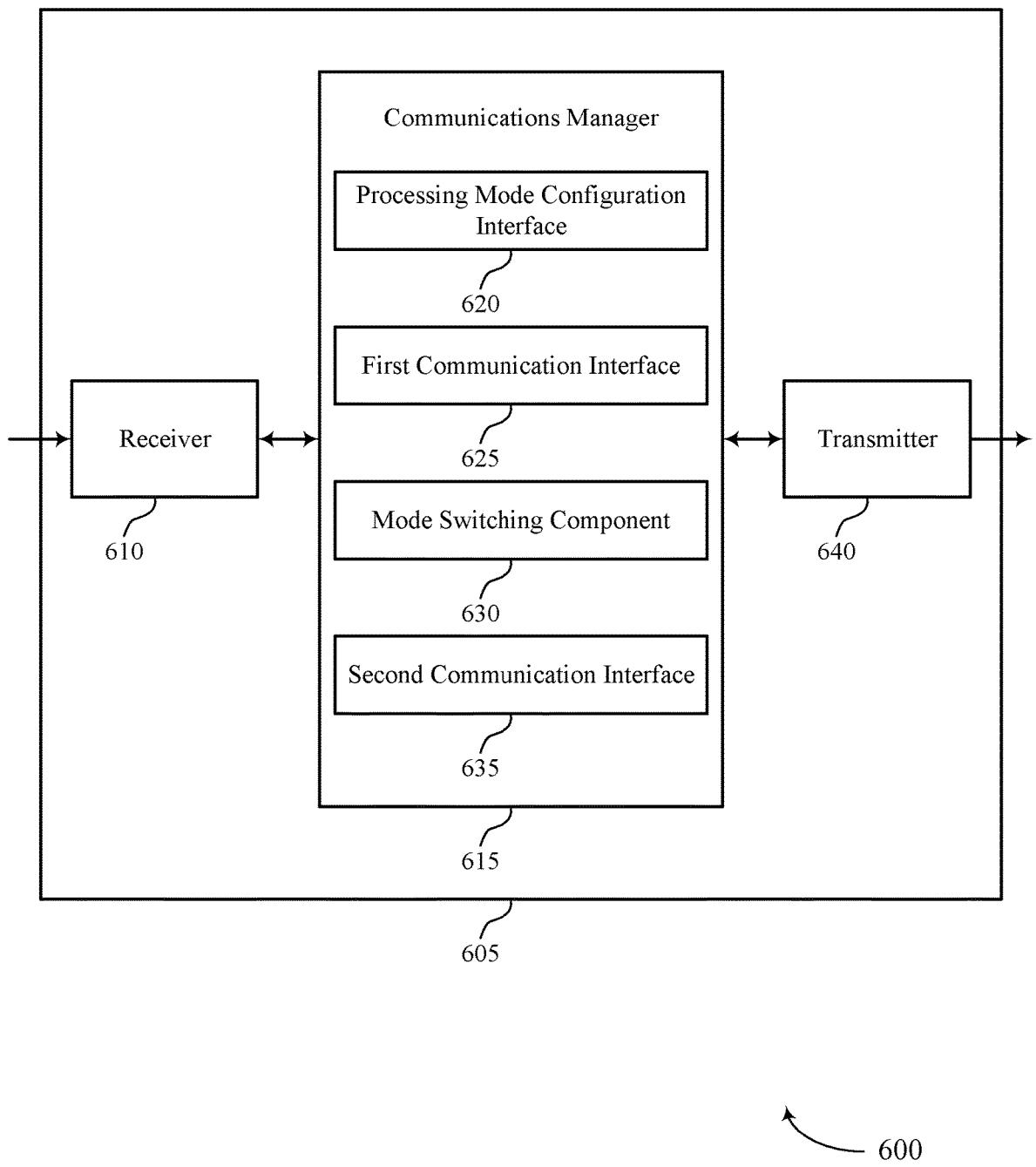

FIG. 6 shows a block diagram 600 of a device 605 that supports adaptive processing modes in accordance with aspects of the present disclosure. The device 605 may be an example of aspects of a device 505, or a UE 115 as described herein. The device 605 may include a receiver 610, a communications manager 615, and a transmitter 640. The device 605 may also include a processor. Each of these components may be in communication with one another (e.g., via one or more buses).

The receiver 610 may receive information such as packets, user data, or control information associated with various information channels (e.g., control channels, data channels, and information related to adaptive processing modes, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a processing mode configuration interface 620, a first communication interface 625, a mode switching component 630, and a second communication interface 635. The communications manager 615 may be an example of aspects of the communications manager 810 described herein.

The processing mode configuration interface 620 may receive, from a base station, a first configuration of a first processing mode for the UE that is associated with communications scheduled for a single slot, and a second configuration of a second processing mode for the UE that is associated with communications scheduled for a set of slots.

The first communication interface 625 may communicate with the base station according to one of the first processing mode or the second processing mode.

The mode switching component 630 may determine that the UE is to switch from communicating according to the one of the first processing mode or the second processing mode to communicating according to a different one of the first processing mode or the second processing mode.

The second communication interface 635 may communicate with the base station according to the different one of the first processing mode or the second processing mode based on determining that the UE is to switch.

The transmitter 640 may transmit signals generated by other components of the device 605. In some examples, the transmitter 640 may be collocated with a receiver 610 in a transceiver module. For example, the transmitter 640 may be an example of aspects of the transceiver 820 described with reference to FIG. 8. The transmitter 640 may utilize a single antenna or a set of antennas.

Figure 7:
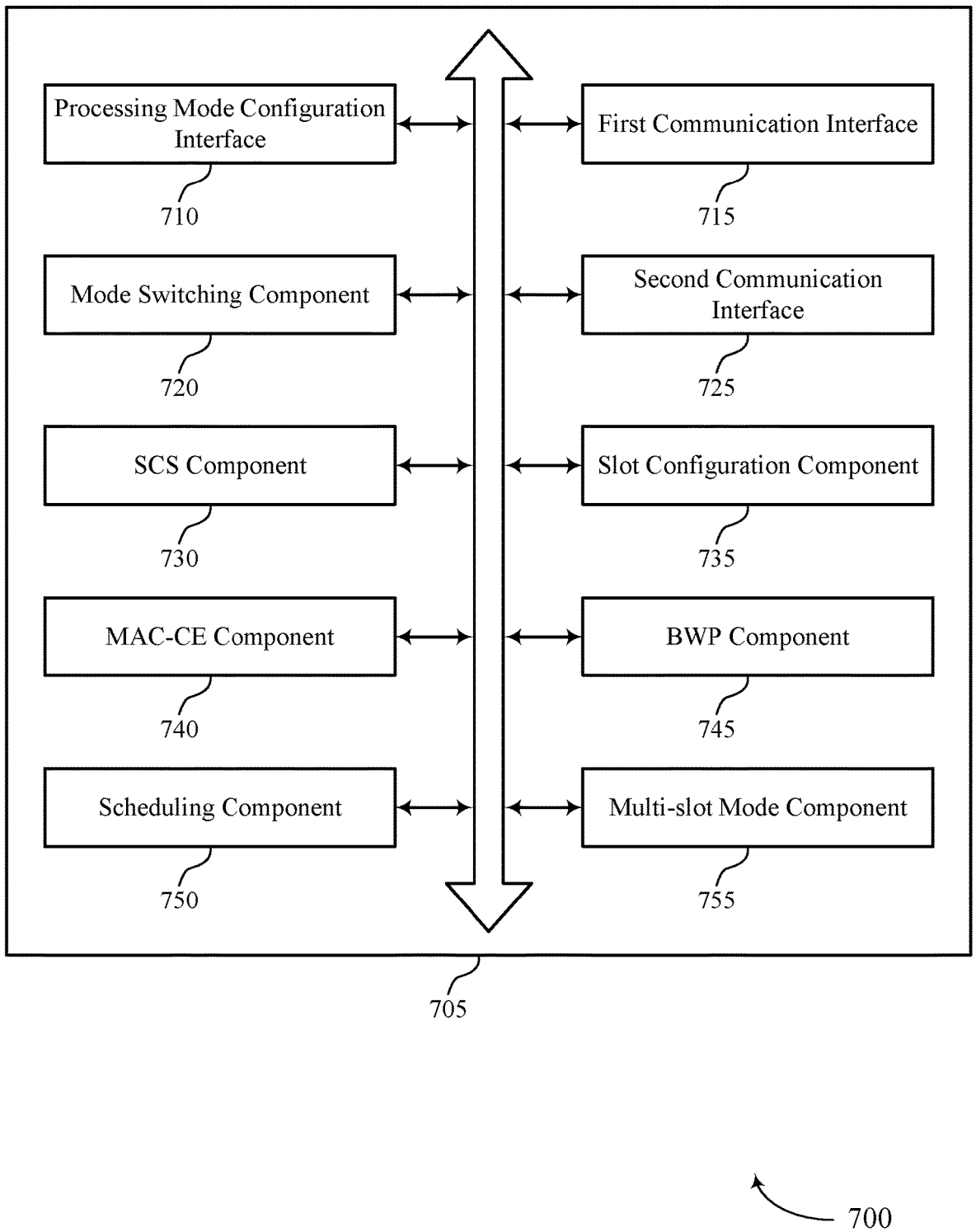
FIG. 7 shows a block diagram of a communications manager that supports adaptive processing modes in accordance with aspects of the present disclosure.

In some cases, the processing mode configuration interface 620, the first communication interface 625, the mode switching component 630, and the second communication interface 635 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features the processing mode configuration interface 620, the first communication interface 625, the mode switching component 630, and the second communication interface 635 discussed herein. A transceiver processor may be collocated with and/or communicate with (e.g., direct the operations of) a transceiver of the device. A radio processor may be collocated with and/or communicate with (e.g., direct the operations of) a radio (e.g., an NR radio, an LTE radio, a Wi-Fi radio) of the device. A transmitter processor may be collocated with and/or communicate with (e.g., direct the operations of) a transmitter of the device. A receiver processor may be collocated with and/or communicate with (e.g., direct the operations of) a receiver of the device FIG. 7 shows a block diagram 700 of a communications manager 705 that supports adaptive processing modes in accordance with aspects of the present disclosure. The communications manager 705 may be an example of aspects of a communications manager 515, a communications manager 615, or a communications manager 810 described herein. The communications manager 705 may include a processing mode configuration interface 710, a first communication interface 715, a mode switching component 720, a second communication interface 725, a SCS component 730, a slot configuration component 735, a MAC-CE component 740, a BWP component 745, a scheduling component 750, and a multi-slot mode component 755. Each of these modules may communicate, directly or indirectly, with one another (e.g., via one or more buses).

The processing mode configuration interface 710 may receive, from a base station, a first configuration of a first processing mode for the UE that is associated with communications scheduled for a single slot, and a second configuration of a second processing mode for the UE that is associated with communications scheduled for a set of slots.

In some examples, the processing mode configuration interface 710 may receive, from the base station, a control message that includes an indication of a quantity of slots of the set of slots, where the UE communicates with the base station according to the second configuration using the second processing mode based on the indicated quantity of slots.

In some examples, the processing mode configuration interface 710 may receive, from the base station, one or more configuration parameter values that are different for the first processing mode and the second processing mode, the one or more configuration parameter values that are different including a search space set periodicity, a time domain resource allocation table, a physical uplink control channel resource, or a combination thereof.

In some examples, the processing mode configuration interface 710 may determine one or more configuration parameter values for the second processing mode based on a quantity of slots for the set of slots.

In some examples, the processing mode configuration interface 710 may receive, from the base station, a control message that activates the set of slots for communications according to the second processing mode, where the UE determines to switch to communicating with the base station according to the second processing mode based on receiving the control message.

In some cases, at least one of the one or more configuration parameter values are shared between the first processing mode and the second processing mode.

The first communication interface 715 may communicate with the base station according to one of the first processing mode or the second processing mode.

The mode switching component 720 may determine that the UE is to switch from communicating according to the one of the first processing mode or the second processing mode to communicating according to a different one of the first processing mode or the second processing mode.

In some examples, the mode switching component 720 may determine, while communicating according to the first processing mode or the second processing mode, that a time duration has passed since the UE has received a scheduling grant from the base station.

In some examples, the mode switching component 720 may determine to switch to communicating with the base station according to the different one of the first processing mode or the second processing mode based on determining that the time duration has passed.

In some examples, the mode switching component 720 may determine to communicate on the resource using the first processing mode or the second processing mode based on the control message scheduling the resource using downlink control information, using semi-persistent scheduling, or using an uplink-configured grant.

The second communication interface 725 may communicate with the base station according to the different one of the first processing mode or the second processing mode based on determining that the UE is to switch.

The SCS component 730 may receive, from the base station, an indication of a reference subcarrier spacing or a reference slot length.

The slot configuration component 735 may determine a length of each slot of the set of slots of the second configuration based on the reference subcarrier spacing or the reference slot length.

In some examples, the slot configuration component 735 may determine a time domain location of the set of slots based on an offset relative to a time domain resource in which the control message is received, where the UE communicates with the base station according to the second processing mode based on determining the time domain location.

In some examples, the slot configuration component 735 may determine a time domain location of the set of slots based on an offset relative to a system reference time, where the UE communicates with the base station according to the second processing mode based on determining the time domain location.

The MAC-CE component 740 may receive, from the base station, a medium access control layer control element (MAC-CE) message or downlink control information message that activates the set of slots.

The BWP component 745 may receive, from the base station, a configuration for a bandwidth part that includes an indication that the bandwidth part is to be used for one of the first processing mode or the second processing mode.

In some examples, the BWP component 745 may determine to transition from a first bandwidth part to a second bandwidth part for the communications, where the UE determines to switch from the first processing mode to the second processing mode or from the second processing mode to the first processing mode based on determining to transition from the first bandwidth part to the second bandwidth part.

The scheduling component 750 may receive, from the base station, downlink control message that schedules a resource for the UE to use for communication.

The multi-slot mode component 755 may communicate over an uplink shared channel, a downlink shared channel, an uplink control channel, a downlink control channel, or a combination, thereof using the set of slots based on the second processing mode.

In some examples, the multi-slot mode component 755 may communicate over an uplink shared channel, a downlink shared channel, or both during the set of slots and communicating over an uplink control channel, a downlink control channel, or both using the single slot based on the second processing mode. In some examples, the multi-slot mode component 755 may communicate over an uplink shared channel, a downlink shared channel, or both during the single slot and communicating over an uplink control channel, a downlink control channel, or both during the set of slots based on the second processing mode.

In some examples, the multi-slot mode component 755 may receive, based on the second configuration for the second processing mode, a physical downlink control channel message during a first slot of the set of slots that schedules one or more uplink messages and one or more downlink messages for the set of slots.

In some examples, the multi-slot mode component 755 may map, based on the second configuration for the second processing mode, a transport block to a physical uplink shared channel resource of one or more slots of the set of slots, where the transport block is transmitted to the base station based on the mapping.

In some cases, the processing mode configuration interface 710, the first communication interface 715, the mode switching component 720, the second communication interface 725, the SCS component 730, the slot configuration component 735, the MAC-CE component 740, a BWP component 745, the scheduling component 750, and a multi-slot mode component 755 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the processing mode configuration interface 710, the first communication interface 715, the mode switching component 720, the second communication interface 725, the SCS component 730, the slot configuration component 735, the MAC-CE component 740, a BWP component 745, the scheduling component 750, and a multi-slot mode component 755 discussed herein.

Figure 8:
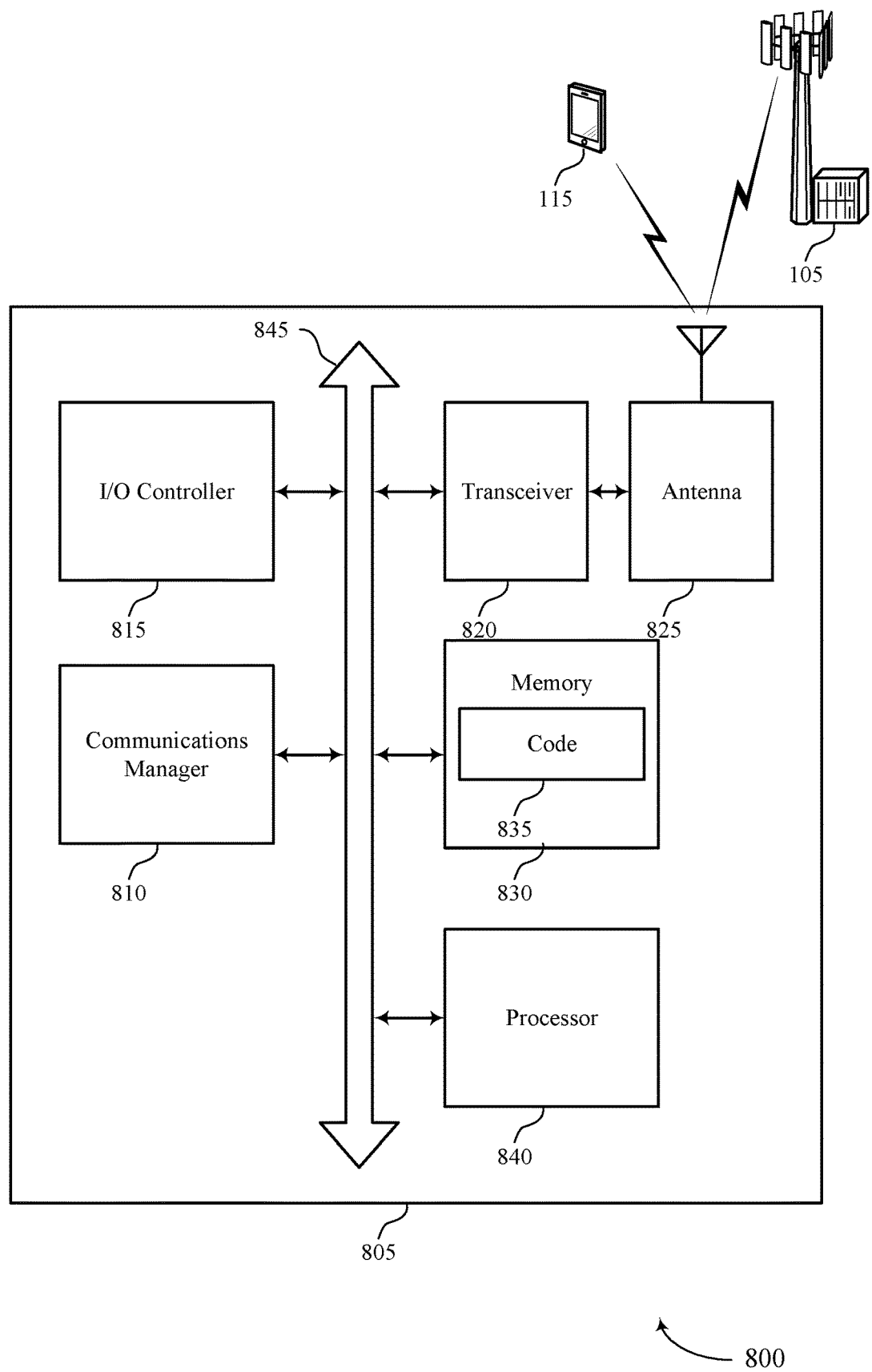
FIG. 8 shows a diagram of a system including a device that supports adaptive processing modes in accordance with aspects of the present disclosure.

FIG. 8 shows a diagram of a system 800 including a device 805 that supports adaptive processing modes in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may receive, from a base station, a first configuration of a first processing mode for the UE that is associated with communications scheduled for a single slot, and a second configuration of a second processing mode for the UE that is associated with communications scheduled for a set of slots, communicate with the base station according to one of the first processing mode or the second processing mode, determine that the UE is to switch from communicating according to the one of the first processing mode or the second processing mode to communicating according to a different one of the first processing mode or the second processing mode, and communicate with the base station according to the different one of the first processing mode or the second processing mode based on determining that the UE is to switch.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described herein. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include RAM and ROM. The memory 830 may store computer-readable, computer-executable code 835 including instructions that, when executed, cause the processor to perform various functions described herein. In some cases, the memory 830 may contain, among other things, a basic input/output system (BIOS) which may control basic hardware or software operation such as the interaction with peripheral components or devices.

The processor 840 may include an intelligent hardware device, (e.g., a general-purpose processor, a digital signal processor (DSP_, a CPU, a microcontroller, a ASIC, a field programmable gate array (FPGA), a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting adaptive processing modes).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
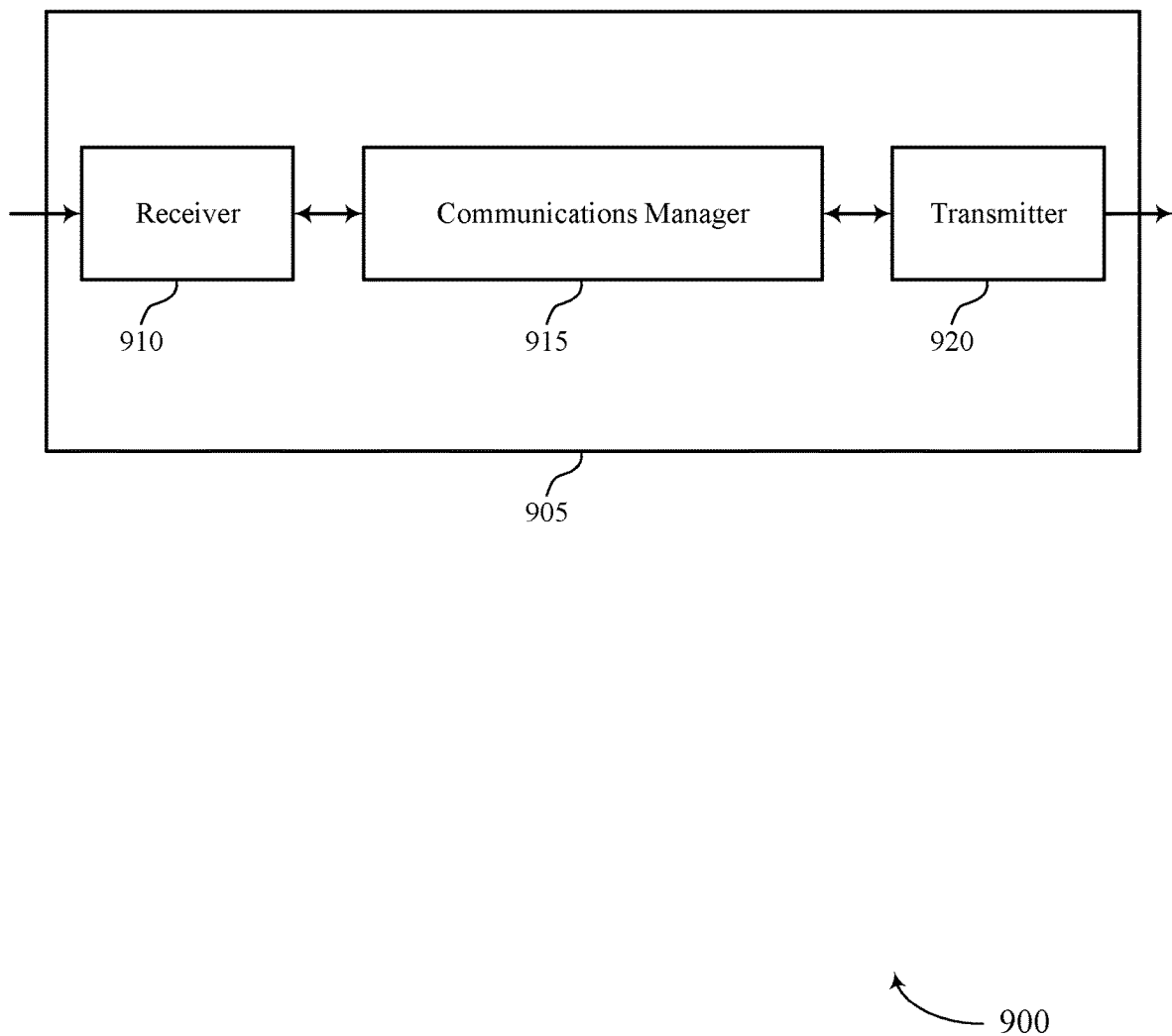
FIGS. 9 and 10 show block diagrams of devices that support adaptive processing modes in accordance with aspects of the present disclosure.

FIG. 9 shows a block diagram 900 of a device 905 that supports adaptive processing modes in accordance with aspects of the present disclosure. The device 905 may be an example of aspects of a base station 105 as described herein. The device 905 may include a receiver 910, a communications manager 915, and a transmitter 920. The device 905 may also include a one or more processors, memory coupled with the one or more processors, and instructions stored in the memory that are executable by the one or more processors to enable the one or more processors to perform the processing mode switching features discussed herein. Each of these components may be in communication with one another (e.g., via one or more buses).

The receiver 910 may receive information such as packets, user data, or control information associated with various information channels (e.g., control channels, data channels, and information related to adaptive processing modes, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may transmit, to a UE, a first configuration of a first processing mode for the UE that is associated with communications scheduled for a single slot, and a second configuration of a second processing mode for the UE that is associated with communications scheduled for a set of slots, communicate with the UE according to one of the first processing mode or the second processing mode, determine that the UE is to switch from communicating according to the one of the first processing mode or the second processing mode to communicating according to a different one of the first processing mode or the second processing mode, and communicate with the UE according to the different one of the first processing mode or the second processing mode based on determining that the UE is to switch. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
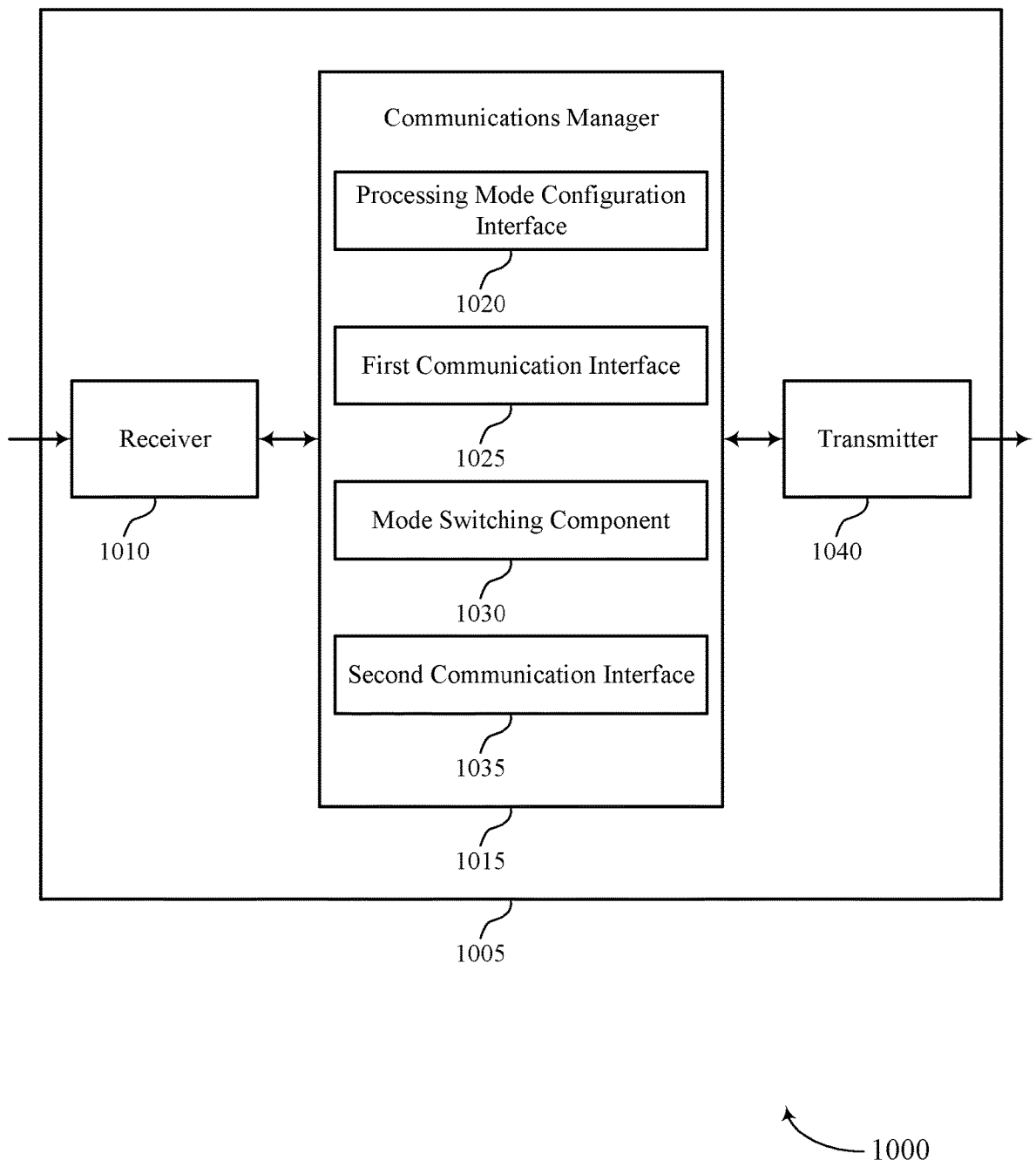

FIG. 10 shows a block diagram 1000 of a device 1005 that supports adaptive processing modes in accordance with aspects of the present disclosure. The device 1005 may be an example of aspects of a device 905, or a base station 105 as described herein. The device 1005 may include a receiver 1010, a communications manager 1015, and a transmitter 1040. The device 1005 may also include a processor. Each of these components may be in communication with one another (e.g., via one or more buses).

The receiver 1010 may receive information such as packets, user data, or control information associated with various information channels (e.g., control channels, data channels, and information related to adaptive processing modes, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a processing mode configuration interface 1020, a first communication interface 1025, a mode switching component 1030, and a second communication interface 1035. The communications manager 1015 may be an example of aspects of the communications manager 1210 described herein.

The processing mode configuration interface 1020 may transmit, to a UE, a first configuration of a first processing mode for the UE that is associated with communications scheduled for a single slot, and a second configuration of a second processing mode for the UE that is associated with communications scheduled for a set of slots.

The first communication interface 1025 may communicate with the UE according to one of the first processing mode or the second processing mode.

The mode switching component 1030 may determine that the UE is to switch from communicating according to the one of the first processing mode or the second processing mode to communicating according to a different one of the first processing mode or the second processing mode.

The second communication interface 1035 may communicate with the UE according to the different one of the first processing mode or the second processing mode based on determining that the UE is to switch.

The transmitter 1040 may transmit signals generated by other components of the device 1005. In some examples, the transmitter 1040 may be collocated with a receiver 1010 in a transceiver module. For example, the transmitter 1040 may be an example of aspects of the transceiver 1220 described with reference to FIG. 12. The transmitter 1040 may utilize a single antenna or a set of antennas.

In some cases, the processing mode configuration interface 1020, the first communication interface 1025, the mode switching component 1030, and the second communication interface 1035 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the processing mode configuration interface 1020, the first communication interface 1025, the mode switching component 1030, and the second communication interface 1035 discussed herein. A transceiver processor may be collocated with and/or communicate with (e.g., direct the operations of) a transceiver of the device. A radio processor may be collocated with and/or communicate with (e.g., direct the operations of) a radio (e.g., an NR radio, an LTE radio, a Wi-Fi radio) of the device. A transmitter processor may be collocated with and/or communicate with (e.g., direct the operations of) a transmitter of the device. A receiver processor may be collocated with and/or communicate with (e.g., direct the operations of) a receiver of the device.

Figure 11:
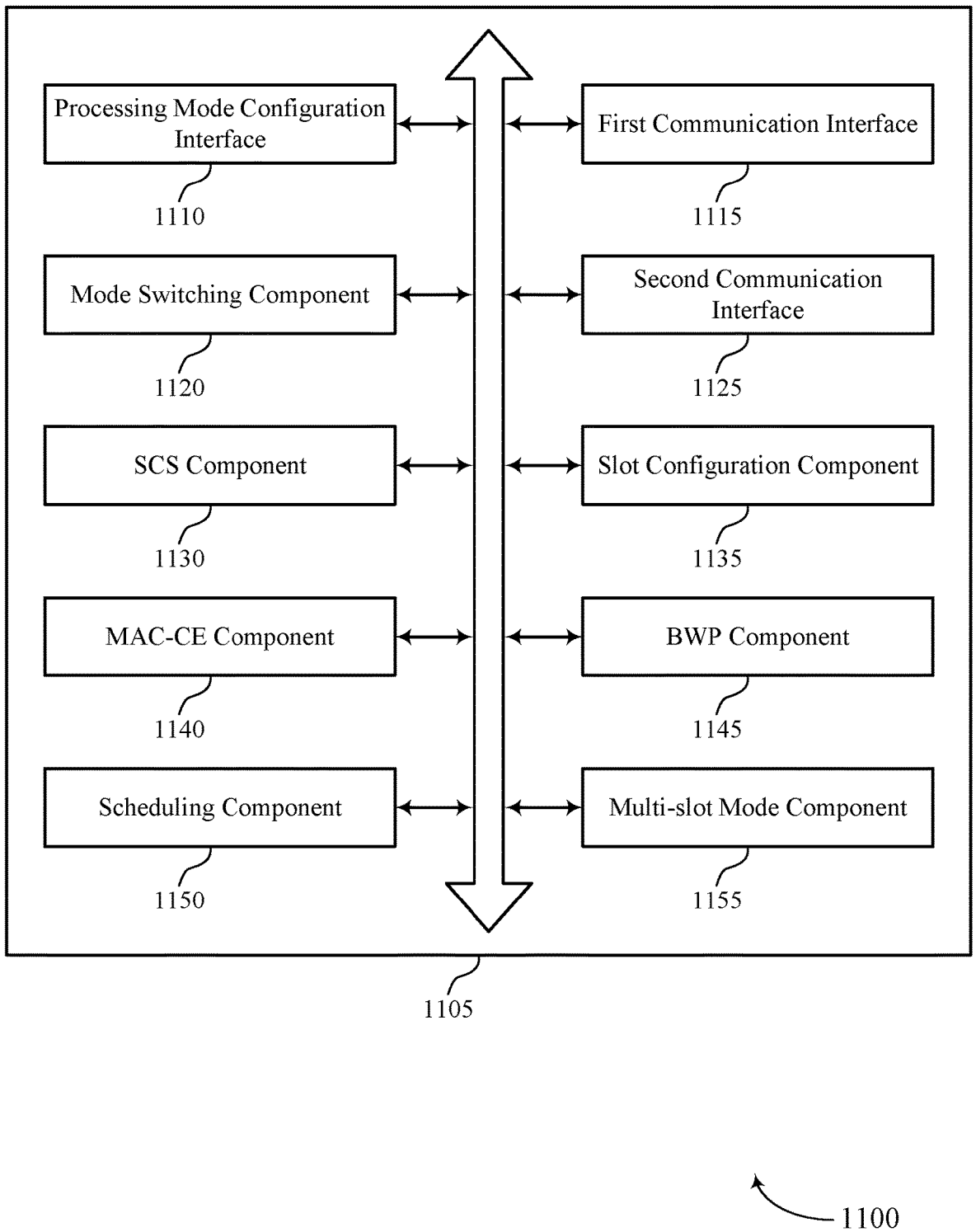
FIG. 11 shows a block diagram of a communications manager that supports adaptive processing modes in accordance with aspects of the present disclosure.

FIG. 11 shows a block diagram 1100 of a communications manager 1105 that supports adaptive processing modes in accordance with aspects of the present disclosure. The communications manager 1105 may be an example of aspects of a communications manager 915, a communications manager 1015, or a communications manager 1210 described herein. The communications manager 1105 may include a processing mode configuration interface 1110, a first communication interface 1115, a mode switching component 1120, a second communication interface 1125, a SCS component 1130, a slot configuration component 1135, a MAC-CE component 1140, a BWP component 1145, a scheduling component 1150, and a multi-slot mode component 1155. Each of these modules may communicate, directly or indirectly, with one another (e.g., via one or more buses).

The processing mode configuration interface 1110 may transmit, to a UE, a first configuration of a first processing mode for the UE that is associated with communications scheduled for a single slot, and a second configuration of a second processing mode for the UE that is associated with communications scheduled for a set of slots.

In some examples, the processing mode configuration interface 1110 may transmit, to the UE, a control message that includes an indication of a quantity of slots of the set of slots, where the UE communicates with the base station according to the second configuration using the second processing mode based on the indicated quantity of slots.

In some examples, the processing mode configuration interface 1110 may transmit, to the UE, one or more configuration parameter values that are different for the first processing mode and the second processing mode, the one or more configuration parameter values that are different including a search space set periodicity, a time domain resource allocation table, a physical uplink control channel resource, or a combination thereof.

In some examples, the processing mode configuration interface 1110 may transmit an indication of one or more configuration parameter values for the second processing mode based on a quantity of slots for the set of slots.

In some examples, the processing mode configuration interface 1110 may transmit, to the UE, a control message that activates the set of slots for communications according to the second processing mode, where the base station determines that the UE is to communicate according to the second processing mode based on transmitting the control message.

In some examples, the processing mode configuration interface 1110 may determine that the UE is to communicate on the resource using the first processing mode or the second processing mode based on the control message scheduling the resource using downlink control information, using semi-persistent scheduling, or using an uplink-configured grant.

In some cases, at least one of the one or more configuration parameter values are shared between the first processing mode and the second processing mode.

The first communication interface 1115 may communicate with the UE according to one of the first processing mode or the second processing mode.

The mode switching component 1120 may determine that the UE is to switch from communicating according to the one of the first processing mode or the second processing mode to communicating according to a different one of the first processing mode or the second processing mode.

In some examples, the mode switching component 1120 may determine, while communicating with the UE according to the first processing mode or the second processing mode, that a time duration has passed since the base station has transmitted a scheduling grant to the UE.

In some examples, the mode switching component 1120 may determine that the UE is to switch to communicating according to the different one of the first processing mode and the second processing mode based on determining that the time duration has passed.

The second communication interface 1125 may communicate with the UE according to the different one of the first processing mode or the second processing mode based on determining that the UE is to switch.

The SCS component 1130 may transmit, to the UE, an indication of a reference subcarrier spacing or a reference slot length.

The slot configuration component 1135 may determine a length of each slot for the set of slots of the second configuration based on the reference subcarrier spacing or the reference slot length.

In some examples, the slot configuration component 1135 may determine a time domain location of the set of slots based on an offset relative to a time domain resource in which the control message is transmitted, where the base station communicates with the UE according to the second processing mode based on determining the time domain location.

In some examples, the slot configuration component 1135 may determine a time domain location of the set of slots based on an offset relative to a system reference time, where the base station communicates with the UE according to the second processing mode based on determining the time domain location.

The MAC-CE component 1140 may transmit, to the UE, a medium access control layer control element (MAC-CE) message or downlink control information message that activates the set of slots.

The BWP component 1145 may transmit, to the UE, a configuration for a bandwidth part that includes an indication that the bandwidth part is to be used for one of the first processing mode or the second processing mode.

In some examples, the BWP component 1145 may determine that the UE is to transition from a first bandwidth part to a second bandwidth part, where the base station determines that the UE is to switch from the first processing mode to the second processing mode or from the second processing mode to the first processing mode based on determining that the UE is to transition from the first bandwidth part to the second bandwidth part.

The scheduling component 1150 may transmit, to the UE, downlink control message that schedules a resource for the UE to use for communication.

The multi-slot mode component 1155 may communicate over an uplink shared channel, a downlink shared channel, an uplink control channel, a downlink control channel, or a combination thereof using the set of slots based on the second processing mode.

In some examples, the multi-slot mode component 1155 may communicate over an uplink shared channel, a downlink shared channel, or both during the set of slots and communicating over an uplink control channel, a downlink control channel, or both using the single slot based on the second processing mode. In some examples, the multi-slot mode component 1155 may communicate over an uplink shared channel, a downlink shared channel, or both during the single slot and communicating over an uplink control channel, a downlink control channel, or both during the set of slots based on the second processing mode.

In some examples, the multi-slot mode component 1155 may transmit, based on the second configuration for the second processing mode, a physical downlink control channel message during a first slot of the set of slots that schedules one or more uplink messages and one or more downlink messages for the set of slots.

In some examples, the multi-slot mode component 1155 may map, based on the second configuration for the second processing mode, a transport block to a physical downlink shared channel resource of one or more slots of the set of slots, where the transport block is transmitted to the UE based on the mapping.

In some cases, the processing mode configuration interface 1110, the first communication interface 1115, the mode switching component 1120, the second communication interface 1125, the SCS component 1130, the slot configuration component 1135, the MAC-CE component 1140, the BWP component 1145, the scheduling component 1150, and the multi-slot mode component 1155 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the processing mode configuration interface 1110, the first communication interface 1115, the mode switching component 1120, the second communication interface 1125, the SCS component 1130, the slot configuration component 1135, the MAC-CE component 1140, the BWP component 1145, the scheduling component 1150, and the multi-slot mode component 1155 discussed herein.

Figure 12:
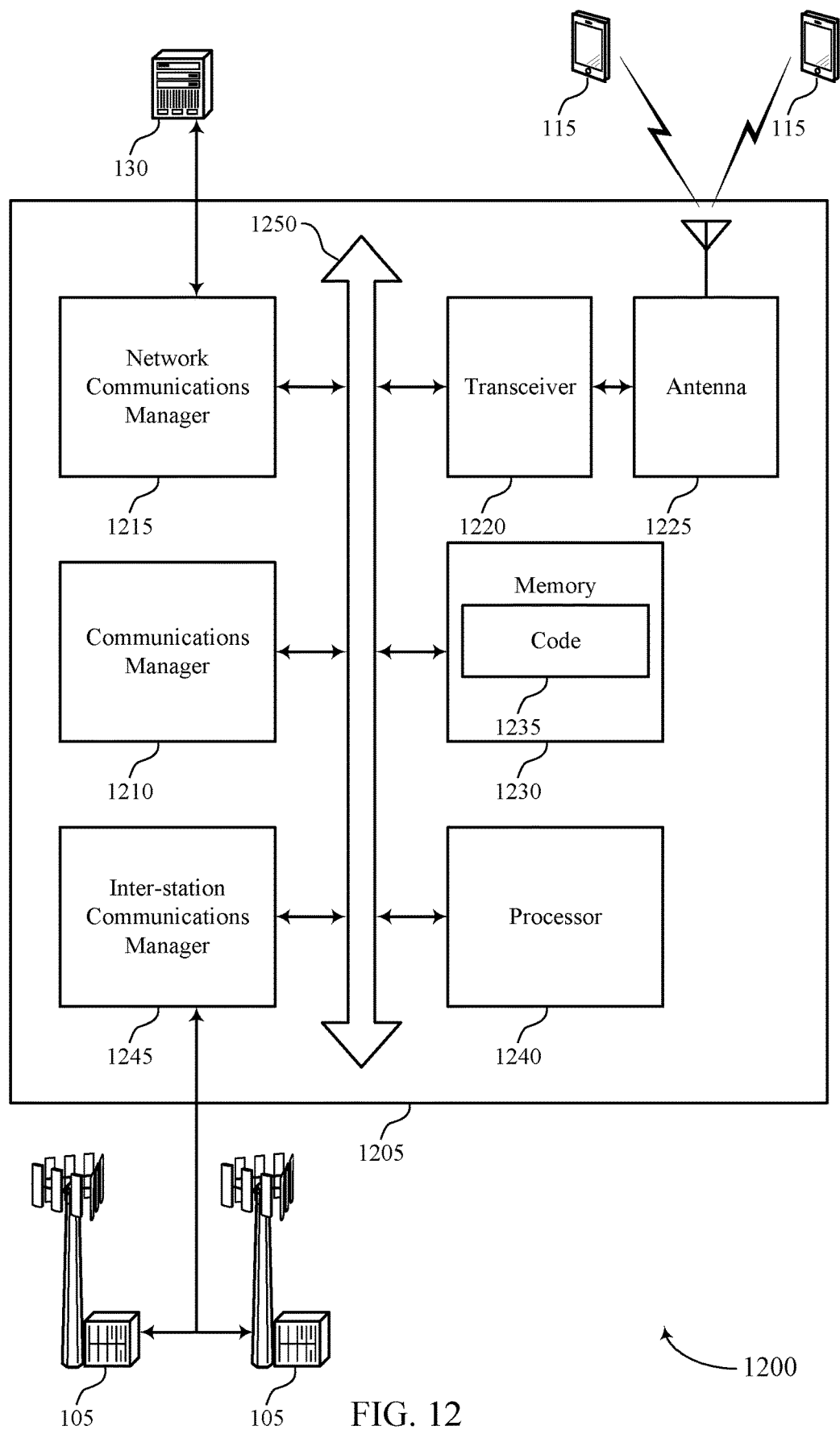
FIG. 12 shows a diagram of a system including a device that supports adaptive processing modes in accordance with aspects of the present disclosure.

FIG. 12 shows a diagram of a system 1200 including a device 1205 that supports adaptive processing modes in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may transmit, to a UE, a first configuration of a first processing mode for the UE that is associated with communications scheduled for a single slot, and a second configuration of a second processing mode for the UE that is associated with communications scheduled for a set of slots, communicate with the UE according to one of the first processing mode or the second processing mode, determine that the UE is to switch from communicating according to the one of the first processing mode or the second processing mode to communicating according to a different one of the first processing mode or the second processing mode, and communicate with the UE according to the different one of the first processing mode or the second processing mode based on determining that the UE is to switch.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described herein. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting adaptive processing modes).

The inter-station communications manager 1245 may manage communications with other base stations 105 and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
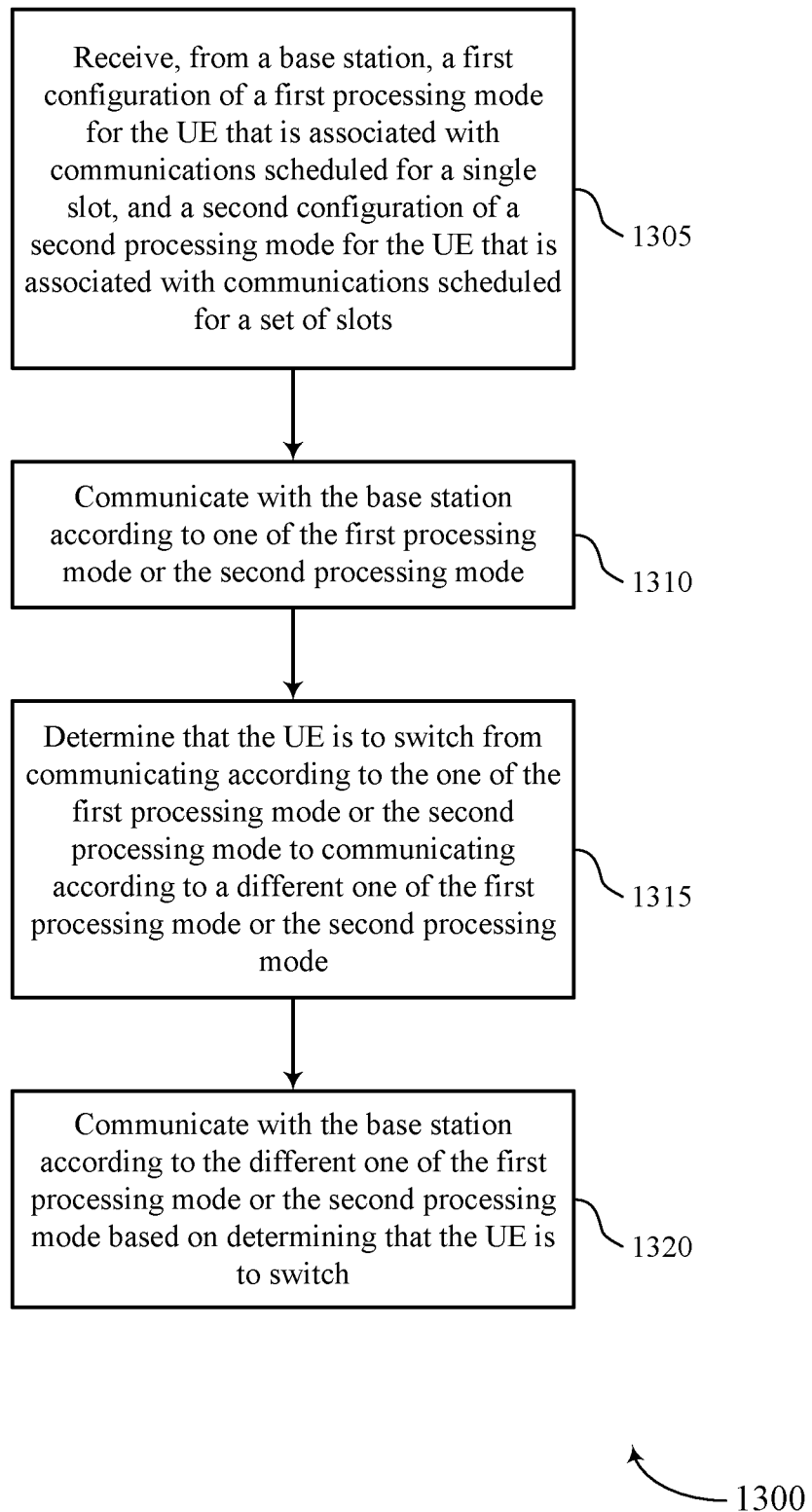
FIGS. 13 and 14 show flowcharts illustrating methods that support adaptive processing modes in accordance with aspects of the present disclosure.

FIG. 13 shows a flowchart illustrating a method 1300 that supports adaptive processing modes in accordance with aspects of the present disclosure. The operations of method 1300 may be implemented by a UE 115 or its components as described herein. For example, the operations of method 1300 may be performed by a communications manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 1305, the UE may receive, from a base station, a first configuration of a first processing mode for the UE that is associated with communications scheduled for a single slot, and a second configuration of a second processing mode for the UE that is associated with communications scheduled for a set of slots. The operations of 1305 may be performed according to the methods described herein. In some examples, aspects of the operations of 1305 may be performed by a processing mode configuration interface as described with reference to FIGS. 5 through 8.

At 1310, the UE may communicate with the base station according to one of the first processing mode or the second processing mode. The operations of 1310 may be performed according to the methods described herein. In some examples, aspects of the operations of 1310 may be performed by a first communication interface as described with reference to FIGS. 5 through 8.

At 1315, the UE may determine that the UE is to switch from communicating according to the one of the first processing mode or the second processing mode to communicating according to a different one of the first processing mode or the second processing mode. The operations of 1315 may be performed according to the methods described herein. In some examples, aspects of the operations of 1315 may be performed by a mode switching component as described with reference to FIGS. 5 through 8.

At 1320, the UE may communicate with the base station according to the different one of the first processing mode or the second processing mode based on determining that the UE is to switch. The operations of 1320 may be performed according to the methods described herein. In some examples, aspects of the operations of 1320 may be performed by a second communication interface as described with reference to FIGS. 5 through 8.

Figure 14:
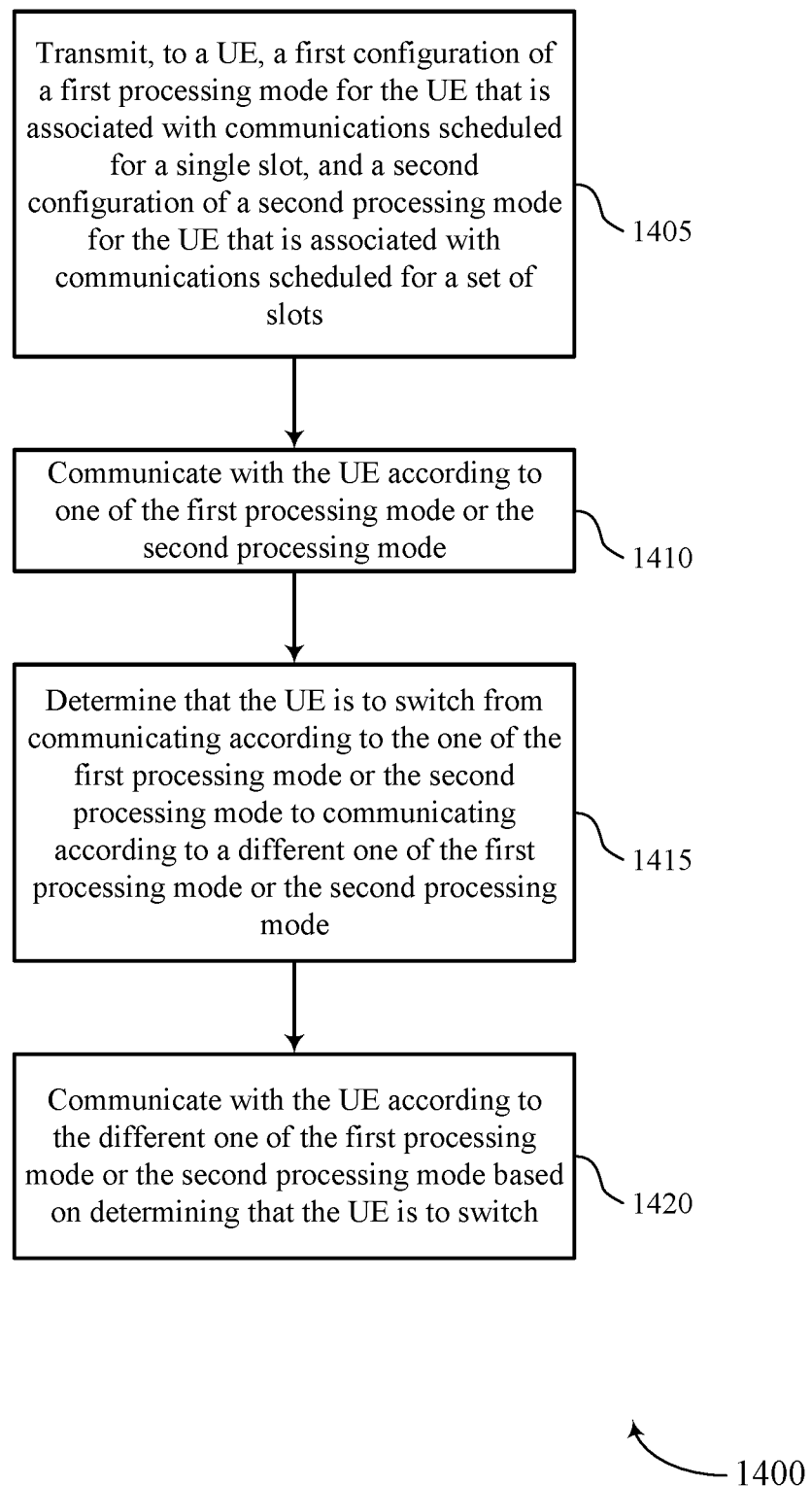

FIG. 14 shows a flowchart illustrating a method 1400 that supports adaptive processing modes in accordance with aspects of the present disclosure. The operations of method 1400 may be implemented by a base station 105 or its components as described herein. For example, the operations of method 1400 may be performed by a communications manager as described with reference to FIGS. 9 through 12. In some examples, a base station may execute a set of instructions to control the functional elements of the base station to perform the functions described herein. Additionally or alternatively, a base station may perform aspects of the functions described herein using special-purpose hardware.

At 1405, the base station may transmit, to a UE, a first configuration of a first processing mode for the UE that is associated with communications scheduled for a single slot, and a second configuration of a second processing mode for the UE that is associated with communications scheduled for a set of slots. The operations of 1405 may be performed according to the methods described herein. In some examples, aspects of the operations of 1405 may be performed by a processing mode configuration interface as described with reference to FIGS. 9 through 12.

At 1410, the base station may communicate with the UE according to one of the first processing mode or the second processing mode. The operations of 1410 may be performed according to the methods described herein. In some examples, aspects of the operations of 1410 may be performed by a first communication interface as described with reference to FIGS. 9 through 12.

At 1415, the base station may determine that the UE is to switch from communicating according to the one of the first processing mode or the second processing mode to communicating according to a different one of the first processing mode or the second processing mode. The operations of 1415 may be performed according to the methods described herein. In some examples, aspects of the operations of 1415 may be performed by a mode switching component as described with reference to FIGS. 9 through 12.

At 1420, the base station may communicate with the UE according to the different one of the first processing mode or the second processing mode based on determining that the UE is to switch. The operations of 1420 may be performed according to the methods described herein. In some examples, aspects of the operations of 1420 may be performed by a second communication interface as described with reference to FIGS. 9 through 12.

The following provides an overview of aspects of the present disclosure:

Aspect 1: A method for wireless communications at a UE, comprising: receiving, from a base station, a first configuration of a first processing mode for the UE that is associated with communications scheduled for a single slot, and a second configuration of a second processing mode for the UE that is associated with communications scheduled for a plurality of slots; communicating with the base station according to one of the first processing mode or the second processing mode; determining that the UE is to switch from communicating according to the one of the first processing mode or the second processing mode to communicating according to a different one of the first processing mode or the second processing mode; and communicating with the base station according to the different one of the first processing mode or the second processing mode based at least in part on determining that the UE is to switch.

Aspect 2: The method of aspect 1, wherein receiving the second configuration comprises: receiving, from the base station, a control message that includes an indication of a quantity of slots of the plurality of slots, wherein the UE communicates with the base station according to the second configuration using the second processing mode based at least in part on the indicated quantity of slots.

Aspect 3: The method of any of aspects 1 through 2, wherein receiving the second configuration comprises: receiving, from the base station, an indication of a reference subcarrier spacing or a reference slot length; and determining a length of each slot of the plurality of slots of the second configuration based at least in part on the reference subcarrier spacing or the reference slot length.

Aspect 4: The method of any of aspects 1 through 3, wherein receiving the first configuration and the second configuration comprise receiving, from the base station, one or more configuration parameter values that are different for the first processing mode and the second processing mode, the one or more configuration parameter values that are different comprising a search space set periodicity, a time domain resource allocation table, a physical uplink control channel resource, or a combination thereof.

Aspect 5: The method of aspect 4, wherein at least one of the one or more configuration parameter values are shared between the first processing mode and the second processing mode.

Aspect 6: The method of any of aspects 1 through 5, wherein receiving the second configuration comprises: determining one or more configuration parameter values for the second processing mode based at least in part on a quantity of slots for the plurality of slots.

Aspect 7: The method of any of aspects 1 through 6, further comprising: receiving, from the base station, a control message that activates the plurality of slots for communications according to the second processing mode, wherein the UE determines to switch to communicating with the base station according to the second processing mode based at least in part on receiving the control message.

Aspect 8: The method of aspect 7, wherein receiving the control message comprises: receiving, from the base station, a medium access control layer control element (MAC-CE) message or downlink control information message that activates the plurality of slots.

Aspect 9: The method of any of aspects 7 through 8, further comprising: determining a time domain location of the plurality of slots based at least in part on an offset relative to a time domain resource in which the control message is received, wherein the UE communicates with the base station according to the second processing mode based at least in part on determining the time domain location.

Aspect 10: The method of any of aspects 1 through 9, wherein determining to switch comprises: determining, while communicating according to the first processing mode or the second processing mode, that a time duration has passed since the UE has received a scheduling grant from the base station; and determining to switch to communicating with the base station according to the to the different one of the first processing mode or the second processing mode based at least in part on determining that the time duration has passed.

Aspect 11: The method of any of aspects 1 through 10, further comprising: receiving, from the base station, a configuration for a bandwidth part that includes an indication that the bandwidth part is to be used for one of the first processing mode or the second processing mode.

Aspect 12: The method of any of aspects 1 through 11, further comprising: determining to transition from a first bandwidth part to a second bandwidth part for the communications, wherein the UE determines to switch from the first processing mode to the second processing mode or from the second processing mode to the first processing mode based at least in part on determining to transition from the first bandwidth part to the second bandwidth part.

Aspect 13: The method of any of aspects 1 through 12, further comprising: receiving, from the base station, downlink control message that schedules a resource for the UE to use for communication; and determining to communicate on the resource using the first processing mode or the second processing mode based at least in part on the control message scheduling the resource using downlink control information, using semi-persistent scheduling, or using an uplink-configured grant.

Aspect 14: The method of any of aspects 1 through 8 and 10 through 13, further comprising: determining a time domain location of the plurality of slots based at least in part on an offset relative to a system reference time, wherein the UE communicates with the base station according to the second processing mode based at least in part on determining the time domain location.

Aspect 15: The method of any of aspects 1 through 14, further comprising: communicating over an uplink shared channel, a downlink shared channel, an uplink control channel, a downlink control channel, or a combination thereof using the plurality of slots based at least in part on the second processing mode.

Aspect 16: The method of any of aspects 1 through 14, further comprising: communicating over an uplink shared channel, a downlink shared channel, or both during the plurality of slots and communicating over an uplink control channel, a downlink control channel, or both using the single slot based at least in part on the second processing mode.

Aspect 17: The method of any of aspects 1 through 14, further comprising: communicating over an uplink shared channel, a downlink shared channel, or both during the single slot and communicating over an uplink control channel, a downlink control channel, or both during the plurality of slots based at least in part on the second processing mode.

Aspect 18: The method of any of aspects 1 through 17, further comprising: receiving, based at least in part on the second configuration for the second processing mode, a physical downlink control channel message during a first slot of the plurality of slots that schedules one or more uplink messages and one or more downlink messages for the plurality of slots.

Aspect 19: The method of any of aspects 1 through 18, further comprising: mapping, based at least in part on the second configuration for the second processing mode, a transport block to a physical uplink shared channel resource of one or more slots of the plurality of slots, wherein the transport block is transmitted to the base station based at least in part on the mapping.

Aspect 20: A method for wireless communications at a base station, comprising: transmitting, to a UE, a first configuration of a first processing mode for the UE that is associated with communications scheduled for a single slot, and a second configuration of a second processing mode for the UE that is associated with communications scheduled for a plurality of slots; communicating with the UE according to one of the first processing mode or the second processing mode; determining that the UE is to switch from communicating according to the one of the first processing mode or the second processing mode to communicating according to a different one of the first processing mode or the second processing mode; and communicating with the UE according to the different one of the first processing mode or the second processing mode based at least in part on determining that the UE is to switch.

Aspect 21: The method of aspect 20, wherein transmitting the second configuration comprises: transmitting, to the UE, a control message that includes an indication of a quantity of slots of the plurality of slots, wherein the UE communicates with the base station according to the second configuration using the second processing mode based at least in part on the indicated quantity of slots.

Aspect 22: The method of any of aspects 20 through 21, wherein transmitting the second configuration comprises: transmitting, to the UE, an indication of a reference subcarrier spacing or a reference slot length; and determining a length of each slot for the plurality of slots of the second configuration based at least in part on the reference subcarrier spacing or the reference slot length.

Aspect 23: The method of any of aspects 20 through 22, wherein transmitting the first configuration and the second configuration comprise transmitting, to the UE, one or more configuration parameter values that are different for the first processing mode and the second processing mode, the one or more configuration parameter values that are different comprising a search space set periodicity, a time domain resource allocation table, a physical uplink control channel resource, or a combination thereof.

Aspect 24: The method of aspect 23, wherein at least one of the one or more configuration parameter values are shared between the first processing mode and the second processing mode.

Aspect 25: The method of any of aspects 20 through 24, wherein transmitting the second configuration comprises: transmitting an indication of one or more configuration parameter values for the second processing mode based at least in part on a quantity of slots for the plurality of slots.

Aspect 26: The method of any of aspects 20 through 25, further comprising: transmitting, to the UE, a control message that activates the plurality of slots for communications according to the second processing mode, wherein the base station determines that the UE is to communicate according to the second processing mode based at least in part on transmitting the control message.

Aspect 27: The method of aspect 26, wherein transmitting the control message comprises: transmitting, to the UE, a medium access control layer control element (MAC-CE) message or downlink control information message that activates the plurality of slots.

Aspect 28: The method of any of aspects 26 through 27, further comprising: determining a time domain location of the plurality of slots based at least in part on an offset relative to a time domain resource in which the control message is transmitted, wherein the base station communicates with the UE according to the second processing mode based at least in part on determining the time domain location.

Aspect 29: The method of any of aspects 20 through 28, wherein determining that the UE is to switch comprises: determining, while communicating with the UE according to the first processing mode or the second processing mode, that a time duration has passed since the base station has transmitted a scheduling grant to the UE; and determining that the UE is to switch to communicating according to the different one of the first processing mode and the second processing mode based at least in part on determining that the time duration has passed.

Aspect 30: The method of any of aspects 20 through 29, further comprising: transmitting, to the UE, a configuration for a bandwidth part that includes an indication that the bandwidth part is to be used for one of the first processing mode or the second processing mode.

Aspect 31: The method of any of aspects 20 through 30, further comprising: determining that the UE is to transition from a first bandwidth part to a second bandwidth part, wherein the base station determines that the UE is to switch from the first processing mode to the second processing mode or from the second processing mode to the first processing mode based at least in part on determining that the UE is to transition from the first bandwidth part to the second bandwidth part.

Aspect 32: The method of any of aspects 20 through 31, further comprising: transmitting, to the UE, downlink control message that schedules a resource for the UE to use for communication; and determining that the UE is to communicate on the resource using the first processing mode or the second processing mode based at least in part on the control message scheduling the resource using downlink control information, using semi-persistent scheduling, or using an uplink-configured grant.

Aspect 33: The method of any of aspects 20 through 27 and 29 through 32, further comprising: determining a time domain location of the plurality of slots based at least in part on an offset relative to a system reference time, wherein the base station communicates with the UE according to the second processing mode based at least in part on determining the time domain location.

Aspect 34: The method of any of aspects 20 through 33, further comprising: communicating over an uplink shared channel, a downlink shared channel, an uplink control channel, a downlink control channel, or a combination thereof using the plurality of slots based at least in part on the second processing mode.

Aspect 35: The method of any of aspects 20 through 33, further comprising: communicating over an uplink shared channel, a downlink shared channel, or both during the plurality of slots and communicating over an uplink control channel, a downlink control channel, or both using the single slot based at least in part on the second processing mode.

Aspect 36: The method of any of aspects 20 through 33, further comprising: communicating over an uplink shared channel, a downlink shared channel, or both during the single slot and communicating over an uplink control channel, a downlink control channel, or both during the plurality of slots based at least in part on the second processing mode.

Aspect 37: The method of any of aspects 20 through 36, further comprising: transmitting, based at least in part on the second configuration for the second processing mode, a physical downlink control channel message during a first slot of the plurality of slots that schedules one or more uplink messages and one or more downlink messages for the plurality of slots.

Aspect 38: The method of any of aspects 20 through 37, further comprising: mapping, based at least in part on the second configuration for the second processing mode, a transport block to a physical downlink shared channel resource of one or more slots of the plurality of slots, wherein the transport block is transmitted to the UE based at least in part on the mapping.

Aspect 39: An apparatus for wireless communications at a UE, comprising a processor; memory coupled with the processor; and instructions stored in the memory and executable by the processor to cause the apparatus to perform a method of any of aspects 1 through 19.

Aspect 40: An apparatus for wireless communications at a UE, comprising at least one means for performing a method of any of aspects 1 through 19.

Aspect 41: A non-transitory computer-readable medium storing code for wireless communications at a UE, the code comprising instructions executable by a processor to perform a method of any of aspects 1 through 19.

Aspect 42: An apparatus for wireless communications at a base station, comprising a processor; memory coupled with the processor; and instructions stored in the memory and executable by the processor to cause the apparatus to perform a method of any of aspects 20 through 38.

Aspect 43: An apparatus for wireless communications at a base station, comprising at least one means for performing a method of any of aspects 20 through 38.

Aspect 44: A non-transitory computer-readable medium storing code for wireless communications at a base station, the code comprising instructions executable by a processor to perform a method of any of aspects 20 through 38.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
receiving, from a base station, a first configuration of a first processing mode for the UE that is associated with communications scheduled for a single slot, and a second configuration of a second processing mode for the UE that is associated with communications scheduled for a plurality of slots and a subcarrier spacing that results in a reduced slot length relative to the single slot for the plurality of slots, wherein the first configuration is indicative of a first set of parameters comprising a first search space set periodicity and a first time domain resource allocation table and the second configuration is indicative of a second set of parameters comprising a second search space set periodicity and a second time domain resource allocation table;
communicating with the base station according to one of the first processing mode or the second processing mode and a corresponding one of the first set of parameters or the second set of parameters;
determining that the UE is to switch from communicating according to the one of the first processing mode or the second processing mode to communicating according to a different one of the first processing mode or the second processing mode; and
communicating with the base station according to the different one of the first processing mode or the second processing mode and a corresponding different one of the first set of parameters or the second set of parameters based at least in part on determining that the UE is to switch.

2. The method of claim 1, wherein receiving the second configuration comprises:
receiving, from the base station, a control message that includes an indication of a quantity of slots of the plurality of slots, wherein the UE communicates with the base station according to the second configuration using the second processing mode based at least in part on the indicated quantity of slots.

3. The method of claim 1, wherein receiving the second configuration comprises:
receiving, from the base station, an indication of a reference subcarrier spacing or a reference slot length; and
determining a length of each slot of the plurality of slots of the second configuration based at least in part on the reference subcarrier spacing or the reference slot length.

4. The method of claim 1, wherein the first configuration is further indicative of a first physical uplink control channel resource and the second configuration is further indicative of a second physical uplink control channel resource.

5. The method of claim 1, wherein receiving the second configuration comprises:
determining one or more configuration parameter values for the second processing mode based at least in part on a quantity of slots for the plurality of slots.

6. The method of claim 1, further comprising:
receiving, from the base station, a control message that activates the plurality of slots for communications according to the second processing mode, wherein the UE determines to switch to communicating with the base station according to the second processing mode based at least in part on receiving the control message.

7. The method of claim 6, further comprising:
determining a time domain location of the plurality of slots based at least in part on an offset relative to a time domain resource in which the control message is received, wherein the UE communicates with the base station according to the second processing mode based at least in part on determining the time domain location.

8. The method of claim 1, wherein determining to switch comprises:
determining, while communicating according to the first processing mode or the second processing mode, that a time duration has passed since the UE has received a scheduling grant from the base station; and
determining to switch to communicating with the base station according to the different one of the first processing mode or the second processing mode based at least in part on determining that the time duration has passed.

9. The method of claim 1, further comprising:
receiving, from the base station, a configuration for a bandwidth part that includes an indication that the bandwidth part is to be used for one of the first processing mode or the second processing mode.

10. The method of claim 1, further comprising:
determining to transition from a first bandwidth part to a second bandwidth part for the communications, wherein the UE determines to switch from the first processing mode to the second processing mode or from the second processing mode to the first processing mode based at least in part on determining to transition from the first bandwidth part to the second bandwidth part.

11. The method of claim 1, further comprising:
receiving, from the base station, a control message that schedules a resource for the UE to use for communication; and
determining to communicate on the resource using the first processing mode or the second processing mode based at least in part on the control message scheduling the resource using downlink control information, using semi-persistent scheduling, or using an uplink-configured grant.

12. The method of claim 1, further comprising:
determining a time domain location of the plurality of slots based at least in part on an offset relative to a system reference time, wherein the UE communicates with the base station according to the second processing mode based at least in part on determining the time domain location.

13. The method of claim 1, further comprising:
receiving, based at least in part on the second configuration for the second processing mode, a physical downlink control channel message during a first slot of the plurality of slots that schedules one or more uplink messages and one or more downlink messages for the plurality of slots.

14. The method of claim 1, further comprising:
mapping, based at least in part on the second configuration for the second processing mode, a transport block to a physical uplink shared channel resource of one or more slots of the plurality of slots, wherein the transport block is transmitted to the base station based at least in part on the mapping.

15. A method for wireless communications at a base station, comprising:
transmitting, to a user equipment (UE), a first configuration of a first processing mode for the UE that is associated with communications scheduled for a single slot, and a second configuration of a second processing mode for the UE that is associated with communications scheduled for a plurality of slots and a subcarrier spacing that results in a reduced slot length relative to the single slot for the plurality of slots, wherein the first configuration is indicative of a first set of parameters comprising a first search space set periodicity and a first time domain resource allocation table and the second configuration is indicative of a second set of parameters comprising a second search space set periodicity and a second time domain resource allocation table;

communicating with the UE according to one of the first processing mode or the second processing mode and a corresponding one of the first set of parameters or the second set of parameters;
determining that the UE is to switch from communicating according to the one of the first processing mode or the second processing mode to communicating according to a different one of the first processing mode or the second processing mode; and
communicating with the UE according to the different one of the first processing mode or the second processing mode and a corresponding different one of the first set of parameters or the second set of parameters based at least in part on determining that the UE is to switch.

16. The method of claim 15, wherein transmitting the second configuration comprises:
transmitting, to the UE, a control message that includes an indication of a quantity of slots of the plurality of slots, wherein the UE communicates with the base station according to the second configuration using the second processing mode based at least in part on the indicated quantity of slots.

17. The method of claim 15, wherein transmitting the second configuration comprises:
transmitting, to the UE, an indication of a reference subcarrier spacing or a reference slot length; and
determining a length of each slot for the plurality of slots of the second configuration based at least in part on the reference subcarrier spacing or the reference slot length.

18. The method of claim 15, wherein the first configuration is further indicative of a first physical uplink control channel resource and the second configuration is further indicative of a second physical uplink control channel resource.

19. The method of claim 15, wherein transmitting the second configuration comprises:
transmitting an indication of one or more configuration parameter values for the second processing mode based at least in part on a quantity of slots for the plurality of slots.

20. The method of claim 15, further comprising:
transmitting, to the UE, a control message that activates the plurality of slots for communications according to the second processing mode, wherein the base station determines that the UE is to communicate according to the second processing mode based at least in part on transmitting the control message.

21. The method of claim 20, further comprising:
determining a time domain location of the plurality of slots based at least in part on an offset relative to a time domain resource in which the control message is transmitted, wherein the base station communicates with the UE according to the second processing mode based at least in part on determining the time domain location.

22. The method of claim 15, wherein determining that the UE is to switch comprises:
determining, while communicating with the UE according to the first processing mode or the second processing mode, that a time duration has passed since the base station has transmitted a scheduling grant to the UE; and
determining that the UE is to switch to communicating according to the different one of the first processing mode and the second processing mode based at least in part on determining that the time duration has passed.

23. The method of claim 15, further comprising:
transmitting, to the UE, a configuration for a bandwidth part that includes an indication that the bandwidth part is to be used for one of the first processing mode or the second processing mode.

24. The method of claim 15, further comprising:
determining that the UE is to transition from a first bandwidth part to a second bandwidth part, wherein the base station determines that the UE is to switch from the first processing mode to the second processing mode or from the second processing mode to the first processing mode based at least in part on determining that the UE is to transition from the first bandwidth part to the second bandwidth part.

25. The method of claim 15, further comprising:
transmitting, to the UE, a control message that schedules a resource for the UE to use for communication; and
determining that the UE is to communicate on the resource using the first processing mode or the second processing mode based at least in part on the control message scheduling the resource using downlink control information, using semi-persistent scheduling, or using an uplink-configured grant.

26. An apparatus for wireless communications at a user equipment (UE), comprising:
memory;
one or more processors coupled with the memory and configured to cause the UE to:
receive, from a base station, a first configuration of a first processing mode for the UE that is associated with communications scheduled for a single slot, and a second configuration of a second processing mode for the UE that is associated with communications scheduled for a plurality of slots and a subcarrier spacing that results in a reduced slot length relative to the single slot for the plurality of slots, wherein the first configuration is indicative of a first set of parameters comprising a first search space set periodicity and a first time domain resource allocation table and the second configuration is indicative of a second set of parameters comprising a second search space set periodicity and a second time domain resource allocation table;
communicate with the base station according to one of the first processing mode or the second processing mode and a corresponding one of the first set of parameters or the second set of parameters;
determine that the UE is to switch from communicating according to the one of the first processing mode or the second processing mode to communicating according to a different one of the first processing mode or the second processing mode; and
communicate with the base station according to the different one of the first processing mode or the second processing mode and a corresponding different one of the first set of parameters or the second set of parameters based at least in part on determining that the UE is to switch.

27. The apparatus of claim 26, wherein the instructions are further executable by the one or more processors to cause the UE to:
receive, from the base station, a control message that activates the plurality of slots for communications according to the second processing mode, wherein the UE determines to switch to communicating with the base station according to the second processing mode based at least in part on receiving the control message.

28. The apparatus of claim 27, wherein the instructions are further executable by the one or more processors to cause the UE to:
determine a time domain location of the plurality of slots based at least in part on an offset relative to a time domain resource in which the control message is received, wherein the UE communicates with the base station according to the second processing mode based at least in part on determining the time domain location.

29. The apparatus of claim 26, wherein the instructions are further executable by the one or more processors to cause the UE to:
receive, from the base station, a configuration for a bandwidth part that includes an indication that the bandwidth part is to be used for one of the first processing mode or the second processing mode.

30. An apparatus for wireless communications at a base station, comprising:
memory;
one or more processors coupled with the memory and configured to cause the UE to
transmit, to a user equipment (UE), a first configuration of a first processing mode for the UE that is associated with communications scheduled for a single slot, and a second configuration of a second processing mode for the UE that is associated with communications scheduled for a plurality of slots and a subcarrier spacing that results in a reduced slot length relative to the single slot for the plurality of slots, wherein the first configuration is indicative of a first set of parameters comprising a first search space set periodicity and a first time domain resource allocation table and the second configuration is indicative of a second set of parameters comprising a second search space set periodicity and a second time domain resource allocation table;
communicate with the UE according to one of the first processing mode or the second processing mode and a corresponding one of the first set of parameters or the second set of parameters;
determine that the UE is to switch from communicating according to the one of the first processing mode or the second processing mode to communicating according to a different one of the first processing mode or the second processing mode; and
communicate with the UE according to the different one of the first processing mode or the second processing mode and a corresponding different one of the first set of parameters or the second set of parameters based at least in part on determining that the UE is to switch.

31. The method of claim 1, wherein receiving the first configuration and the second configuration comprises:
receiving radio resource control (RRC) signaling that is indicative of the first set of parameters associated with communications scheduled for the single slot and the second set of parameters associated with communications scheduled for the plurality of slots.

* * * * *